United States Patent
Arner et al.

(10) Patent No.: US 8,341,595 B2
(45) Date of Patent: Dec. 25, 2012

(54) SYSTEM AND METHOD FOR DEVELOPING RICH INTERNET APPLICATIONS FOR REMOTE COMPUTING DEVICES

(75) Inventors: Michael Arner, Brighton, MA (US); John Rodley, Scituate, MA (US); Will W. Graylin, Saugus, MA (US)

(73) Assignee: Roam Data Inc, Boston, MA (US)

( * ) Notice: Subject to any disclaimer, the term of this patent is extended or adjusted under 35 U.S.C. 154(b) by 1131 days.

(21) Appl. No.: 12/198,944

(22) Filed: Aug. 27, 2008

(65) Prior Publication Data

US 2009/0013310 A1    Jan. 8, 2009

Related U.S. Application Data

(63) Continuation-in-part of application No. 11/755,079, filed on May 30, 2007, now Pat. No. 7,650,390.

(60) Provisional application No. 60/969,428, filed on Aug. 31, 2007.

(51) Int. Cl.
*G06F 9/44* (2006.01)

(52) U.S. Cl. ........ 717/109; 717/104; 717/105; 717/121; 717/140

(58) Field of Classification Search .................. None
See application file for complete search history.

(56) References Cited

U.S. PATENT DOCUMENTS

| | | | |
|---|---|---|---|
| 6,826,398 | B1 | 11/2004 | Lagerstrom et al. |
| 7,000,180 | B2 | 2/2006 | Bathhaser |
| 7,546,602 | B2 * | 6/2009 | Hejlsberg et al. ............. 719/313 |
| 2002/0184610 | A1 * | 12/2002 | Chong et al. ................... 717/109 |
| 2004/0117759 | A1 * | 6/2004 | Rippert et al. ................. 717/100 |
| 2004/0177335 | A1 * | 9/2004 | Beisiegel et al. ............. 717/102 |
| 2005/0038796 | A1 | 2/2005 | Carlson et al. |
| 2005/0044197 | A1 * | 2/2005 | Lai ................................. 709/223 |
| 2005/0198612 | A1 | 9/2005 | Gonzalez |
| 2006/0095274 | A1 * | 5/2006 | Phillips et al. ..................... 705/1 |
| 2006/0112188 | A1 | 5/2006 | Albanese et al. |
| 2006/0225032 | A1 * | 10/2006 | Klerk et al. .................... 717/105 |
| 2006/0236307 | A1 * | 10/2006 | Debruin et al. ............... 717/117 |
| 2006/0248506 | A1 * | 11/2006 | Luo et al. ....................... 717/104 |
| 2006/0253834 | A1 * | 11/2006 | Cacenco et al. ............. 717/107 |

(Continued)

OTHER PUBLICATIONS

O'Rourke, C. A Look at Rich Internet Applications. Oracle Magazine (online). Jul. 19, 2004. Retrieved from the Internet: <URL: http://wolfpaulus.com/theodore/doc/richinetapp.pdf>.

Noda, T. et al. Rich Internet Applications—Technical Comparison and Case Studies of AJAX, Flash, and Java based RIA. UW E-Business Consortium (online). Nov. 16, 2005. Retrieved from the Internet: <URL: https://www.uwebc.org/opinionpapers/archives/docs/RIA.pdf>.

*Primary Examiner* — Isaac Tecklu
(74) *Attorney, Agent, or Firm* — AKC Patents LLC; Aliki K. Collins

(57) ABSTRACT

A system for developing rich internet applications (RIAs) for remote computing devices that utilize a certifying player to invoke server-side web services through a single, secure, certifying intermediary server, includes an integrated development environment (IDE). The IDE includes a toolbox comprising graphical components configured to be dragged and dropped into UI states implementing the RIA process flow and a Web Service Description Language (WSDL) integrator for generating web service call for accessing web services for processing input from the UI states and generating an output result.

20 Claims, 26 Drawing Sheets

U.S. PATENT DOCUMENTS

2007/0106468 A1    5/2007  Eichenbaum et al.
2007/0157096 A1*   7/2007  Keren et al. .................. 715/760
2007/0198968 A1*   8/2007  Shenfield et al. ............. 717/104
2007/0202941 A1    8/2007  Miltenberger et al.
2007/0282858 A1   12/2007  Arner et al.
2008/0040371 A1    2/2008  Bayyapu et al.

* cited by examiner

SYSTEM AND METHOD FOR DEVELOPING RICH INTERNET APPLICATIONS FOR REMOTE COMPUTING DEVICES

CROSS REFERENCE TO RELATED CO-PENDING APPLICATIONS

This application claims the benefit of U.S. provisional application Ser. No. 60/969,428 filed on Aug. 31, 2007 and entitled SYSTEM AND METHOD FOR DEVELOPING RICH INTERNET APPLICATIONS FOR REMOTE COMPUTING DEVICES which is commonly assigned and the contents of which are expressly incorporated herein by reference.

This application is also a continuation in part of U.S. application Ser. No. 11/755,079 filed on May 30, 2007 and entitled SYSTEM AND METHOD FOR PLAYING RICH INTERNET APPLICATIONS IN REMOTE COMPUTING DEVICES which is commonly assigned and the contents of which are expressly incorporated herein by reference.

FIELD OF THE INVENTION

The present invention relates to a system and a method for developing Rich-Internet-Applications (RIAs), and in particular to an Integrated Development Environment (IDE) for developing RIAs designed to run on remote computing devices.

BACKGROUND OF THE INVENTION

Desktop applications provide a rich user interface experience, are not complex or difficult to develop and use local hardware and software resources which allow them to be responsive and to interact with other connected devices. One example of a desktop application is Microsoft Outlook™, an application designed for checking e-mail, managing a calendar and contact information. On the other hand, web-based applications are applications accessed with a web browser over a network. One example of a web-based application is Hotmail™, a website for checking e-mail. Web-based applications are easy to deploy and manage and can be deployed even on mobile devices that are sporadically connected to a network. Smart-client applications are applications that combine the best of the desktop applications and web-based applications. They use local hardware and software resources and provide a rich user interface experience. They are connected applications that exchange data on the Internet or any other enterprise network. They are also capable of running offline and can be easily deployed and updated. Smart-client applications are poised to replace traditional web-based applications on desktop computing devices and eventually on remote mobile devices because computer users are accustomed to a rich media experience and expect to have a similarly rich experience when they use web-based applications, even on mobile devices. When we use the term desktop applications, we specifically include both applications developed for the desktop and applications developed for remote devices using traditional desktop methodologies.

Rich Internet Applications (RIA) are smart-client web-applications that have the functionality of traditional desktop applications, but transfer the processing necessary for the user interface to the web client while keeping the bulk of the data back on the application server.

Mobile remote devices include mobile phones, personal digital assistants (PDAs), point of sale (POS) devices, tablets, pagers and laptop computers, among others. Mobile remote devices are usually underpowered, only sporadically connected to a server and usually via a limited bandwidth connection. Mobile devices have extremely limited storage and processing capacity and are often out of their areas of coverage, or not connected to the network for other reasons. Furthermore, mobile devices are susceptible to loss and/or theft, have varying capabilities, and usually run on varying platforms and operating systems. Applications for remote mobile devices (i.e., mobile remote applications) are difficult to develop and deploy due to the varying platforms and operating systems. Mobile applications are also difficult to certify and control once deployed. They are inherently insecure due to the remote device's mobility and susceptibility to theft/loss and due to the fact that they are usually developed based on assumptions and/or methodologies valid for the desktop environment.

Historically, mobile application development has been performed by highly trained programmers. However, more and more lay people are attempting to develop mobile applications, but the currently available development languages and environments make the task difficult for non-highly trained programmers. The intermittent connectivity of mobile devices makes downloading and deploying of applications an error-prone process, which becomes more error-prone the richer and larger the application becomes. In addition, mobile devices often require the use of device-specific mechanisms to install applications above and beyond the effort needed to get the actual bytecodes. High-value applications, such as mobile payment applications, often have to be certified by a neutral third party to adhere to best security practices. The certification process for wireless applications is extremely lengthy, involving certification of all elements of the application, such as the server software, the client software, the communications protocol, among others. In some cases, certification can last several years, so that the majority of the development cycle is spent waiting. Once an application is deployed in a mobile device, it is difficult to control it because one can not assume that the device is in a single physical location and/or under the control of the 'the person who usually sits at that location'. Applications deployed on mobile devices are inherently insecure due to the mobility of the device and the ease of becoming lost. Data stored on a lost mobile device can be intercepted by people for whom they were not intended and the device itself is easily 'intercepted'. Enterprise desktop applications are designed to run on a physical desktop contained within the physical enterprise as a logical node on the enterprise network. Their physical security is contained within the physical security of the enterprise and their network activities are bounded by whatever restrictions the enterprise network administrator chooses to impose on them. On the other hand, mobile applications run outside the physical boundaries of the enterprise and are logical network nodes on the public network and thus typically not subject to any restrictions as to what other network nodes they might contact. Therefore, mobile devices are insecure in practice when running applications developed for the desktop or applications developed using traditional desktop methodologies.

Ideally, rich internet applications (RIAs) designed to run on mobile devices must address all of these limitations. Furthermore, it is desirable for applications to be platform independent, allowing an enterprise to deploy it on its mobile devices as well as its desktop machines and other devices. Existing client pieces for delivering RIAs are too heavy for cellphones, and existing smart client solutions require programming knowledge, which excludes many potential developers. Prior art smart-client solutions include the following:

J2ME, the Java 2 Micro Edition is a pared-down version of the Java Virtual Machine (JVM) designed to run on cell-phones, personal digital assistants (PDAs), and other mobile devices. However, J2ME solutions are not secure when networked as J2ME does not address the issue of how to restrict devices from promiscuous/dangerous network connectivity. J2ME is an enabling technology and platform. JVM type solutions require custom client-side programming, network programming, and server-side integration.

.NET Compact Framework s a version of the .NET Framework that is designed to run on mobile devices such as PDAs and mobile phones. The .NET Framework is a key Microsoft offering, and is intended to be used by most new applications created for the Windows platform. Similar to the J2ME, it is an enabling technology and platform, but lacks security when networked.

AJAX, Asynchronous JavaScript and XML, is a collection of technologies used to bring RIAs to browsers. AJAX applications are complex to develop and deploy, and impossible to access-control. Furthermore AJAX calls can go anywhere, which makes it not suitable for enterprise.

FLEX is a simplified XML language that can be translated into Flash and integrated with server components. FLEX can call any URL, web-service oriented or not, and so is not bound by or compliant with any web-service standards, and thus sacrifices security.

Flash Lite is a pared-down version of the Macromedia Flash Player designed to run on cell-phones, personal digital assistants (PDAs), and other mobile devices. Flash solutions are not inherently secure when networked as Flash does not address the issue of how to restrict devices from promiscuous/dangerous network connectivity. Flash again is an enabling technology, a platform upon which an application player can run.

LAZSLO, a development platform for RIAs that incorporates the Lazslo server. LAZSLO lacks security focus and addresses only a single aspect of the problem, i.e., how to deliver the same application to multiple device types.

Wireless Application Protocol (WAP) browser-type applications. WAP is an open international standard for applications that use wireless communications for providing Internet access to a mobile device. WAP sites are websites written in Wireless Markup Language (WML) and are accessed via a WAP browser. WAP based solutions have limited off-line capabilities, make bandwidth demands proportional to the sophistication of the UI, require custom server-side integration, and suffer from the security vulnerabilities of non-stated, open-endpoint network applications. They also have severe restrictions with respect to which client-side peripherals they can access.

Therefore there is a need for a method for developing RIAs for a variety of devices, including both desktop and mobile devices that overcomes the above mentioned security, access control, computing power, bandwidth and platform problems.

SUMMARY OF THE INVENTION

The present invention relates to a system and a method for developing rich internet applications for remote computing devices that utilize a certified player to invoke server-side web services through a single, secure, certified server intermediary.

In general, in one aspect, the invention features a method for developing a Rich Internet Application (RIA) configured to run on a remote computing device by an application player residing in the remote computing device. The method includes providing an integrated development environment (IDE) for authoring the RIA. The IDE comprises a toolbox for adding graphical components to a user interface (UI) state, a Web Service Description Language (WSDL) integrator for accessing and manipulating web services and tools for adding logic to the graphical components of the user interface state. Next, developing a RIA process flow and implementing the RIA process flow with the IDE by generating one or more UI states. Next, dragging and dropping one or more graphical components from the toolbox into the UI states and setting one or more property values for each of the graphical components. Next, generating with the WSDL integrator one or more web service calls for accessing one or more web services. The web services are configured to receive input from the UI states, process it and produce an output. The web services are accessed by connecting the remote computing device to an intermediary server and the intermediary server accesses the web services via a single, secure and access-controlled network connection.

Implementations of this aspect of the invention may include one or more of the following features. The RIA process flow comprises an input UI state, a processing UI state, an output UI state and an error UI state. The graphical components may be a label for displaying content, textbox for entering content, or a selector for initiating processing via the web service calls. The properties of the graphical components may be a name, horizontal and vertical location coordinates, height, width, length, persistency, visibility, text format, numeric format, alignment, style, key associated with a selector, or target state for a selector. The method may further comprise adding logic to the UI graphical components. The IDE is configured to provide a state view of the RIA, a score view of the RIA, a code view of the RIA and a script view of the RIA. The state view displays a visual image of a UI state, one state at a time, the score view displays a table listing the graphical components for each state, the code view displays code associated with each state, the script view displays script associated with a single graphical component, and the RIA is configured to be authored in any of the views. The RIA comprises an Extensible Mark-up Language (XML) format. The method may further include submitting the RIA to a testing server, debugging and validating the application by the testing server, converting the web service calls to Global Unique Identifiers (GUIDs), transforming the RIA format to the computing device's format and deploying the RIA to the remote computing device. The RIA process flow may include more than one input UI or output UI states.

In general, in another aspect, the invention features a system for developing a Rich Internet Application (RIA) configured to run on a remote computing device by an application player residing in the remote computing device. The system includes an integrated development environment (IDE) including a toolbox and a Web Service Description Language (WSDL) integrator configured to generate one or more web service call for accessing one or more web services for processing input from the UI states. The IDE toolbox includes graphical components configured to be dragged and dropped into UI states implementing the RIA process flow and tools for setting one or more property values for each of the graphical components. The web services are accessed by connecting the remote computing device to an intermediary server and the intermediary server accesses the web services via a single, secure and access-controlled network connection.

Among the advantages of this invention may be one or more of the following. The invention provides a secure access-controlled channel from remote computing devices to enterprise web services. Channeling all communication with the network through a single, secure, certified server intermediary provides web service security, web service access control, device access control and authentication, link security, auditing, and granularity of access control. All data are secure even during transmission across the network. The system provides auditing and tracking of business activities thereby facilitating the device's interactions with the outside world. The system provides granularity of access control to the level of individual web service calls. Furthermore, the use of an application player rather than attempting to run RIAs directly on the client device provides platform independence for the RIA, enables functionality even when off-line, and abbreviates the length of the application certification process. Applications are easy to develop through the system Integrated Development Environment (IDE). Much of the challenge of creating an effective RIA is in designing a user interface that provides a satisfying experience. The invention incorporates a drag-and-drop graphical user interface for RIA development, which opens secure, device agnostic development up to a wide variety of programmers, even those not trained as software engineers.

DETAILED DESCRIPTION OF THE INVENTION

The invention provides a system and a method for developing Rich-Internet-Applications (RIAs) designed to run on mobile devices. The system includes a set of tools that provide the functions of connecting the mobile device securely to web services, auditing the mobile device's activity, restricting the device's access to authorized functions, and providing a user interface (UI) for the mobile device. The set of tools includes an Integrated Development Environment (IDE), an application emulator, an application player 1110, shown in FIG. 2 and FIG. 5, and a server 3000, shown in FIG. 1 and FIG. 5. The IDE is used for developing the web-service oriented applications so that they run on mobile devices. The emulator is used for testing the developed mobile-device-ready RIAs on a desktop computer prior to releasing for use on the mobile devices. The application player is used to run the applications on the mobile device and the server is used to provide a secure connection between the mobile device and the web services. The server also provides application administration and auditing.

Figure 1:
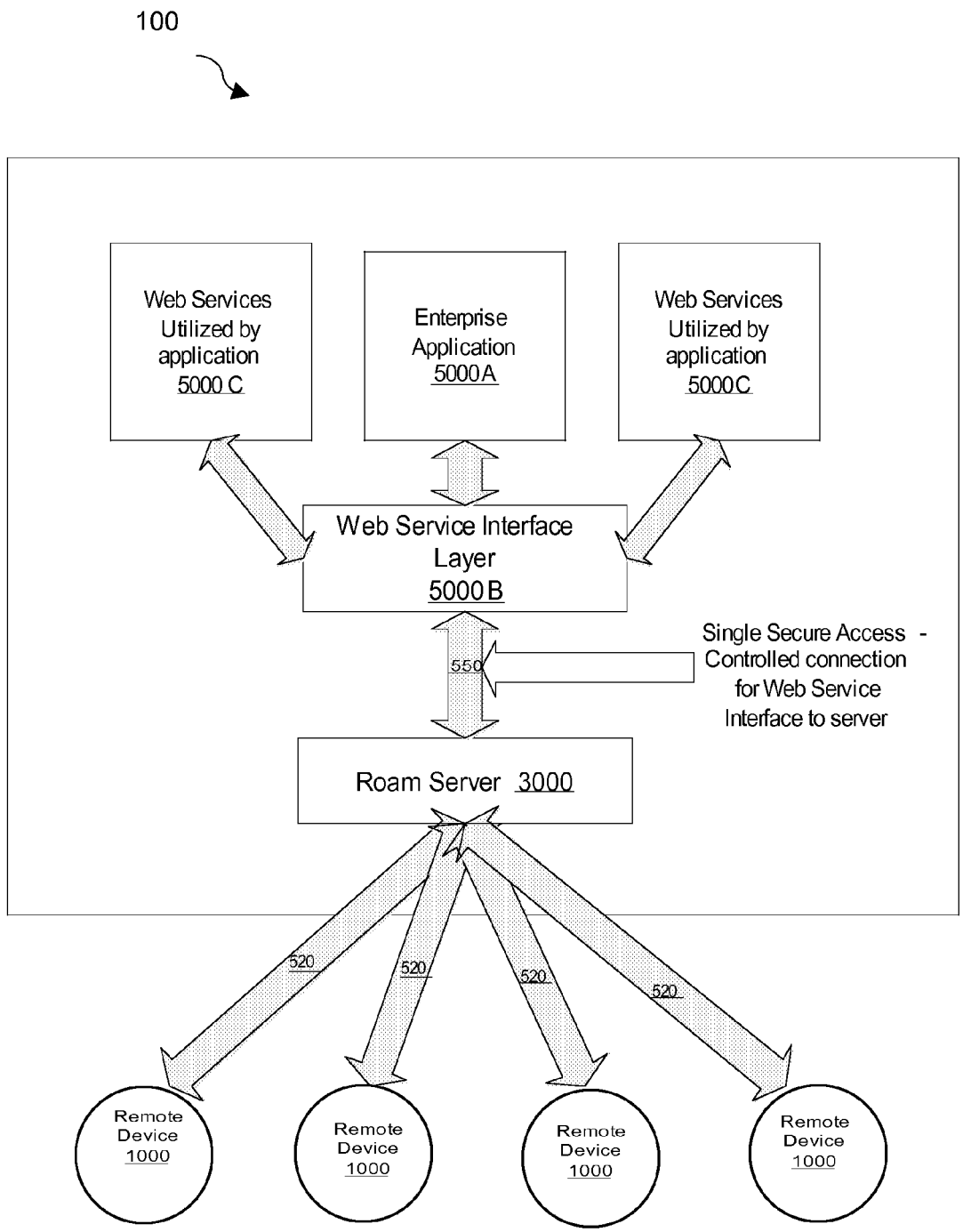
FIG. 1 is an overview diagram of the physical enterprise system.
Figure 5:
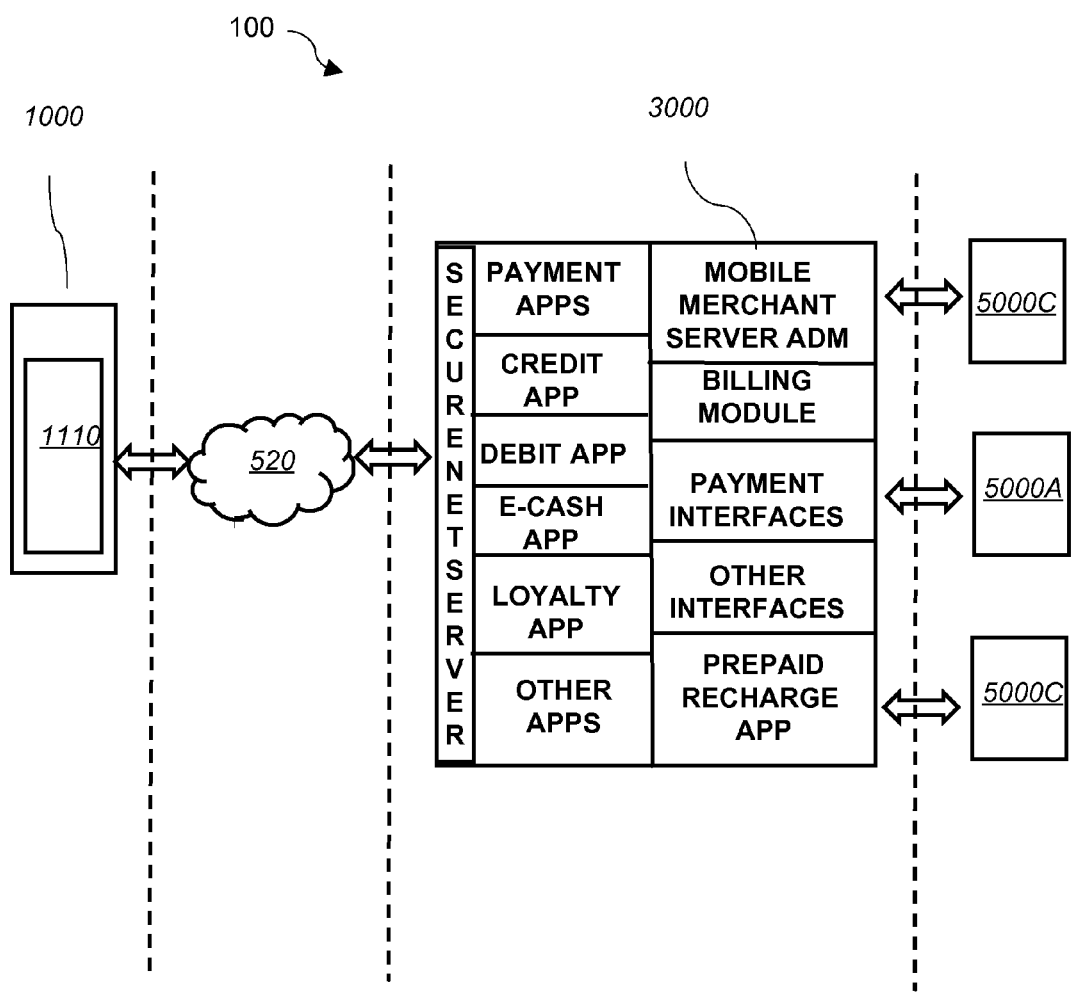
FIG. 5 is an overview diagram of the intermediary server connecting a remote computing device to web services.

Referring to FIG. 1 and FIG. 5, system 100 comprises one or more client devices 1000 interacting with server 3000 via network connections 520. The server 3000 is in contact with an enterprise application 5000A via a web service interface layer 5000B. Server 3000 is also in contact with other web services 5000C utilized by the application via the web service interface layer 5000B. The web service interface layer 5000B is connected to the server 3000 via a single, secure, access controlled connection 550.

Client Device 1000 is usually a handheld remote communication device on which the application user interface is executed. Examples of handheld communication devices include mobile phones, personal digital assistant (PDA), payment modules and portable computers, among others. In other embodiments client device 1000 is a not-handheld device, such a personal computer, server or any other computing circuits.

Server 3000 is a single, secure server through which the enterprise application 5000A and the client device 1000 communicate. Client device 1000 is able to contact only server 3000 and server 3000 controls the communication between the enterprise application 5000A (and its potentially sensitive or proprietary data) and those client devices that wish to use it. This enables authentication of the client device and application, as well as encryption and secure transmission of network requests from the client device 1000.

Figure 2:
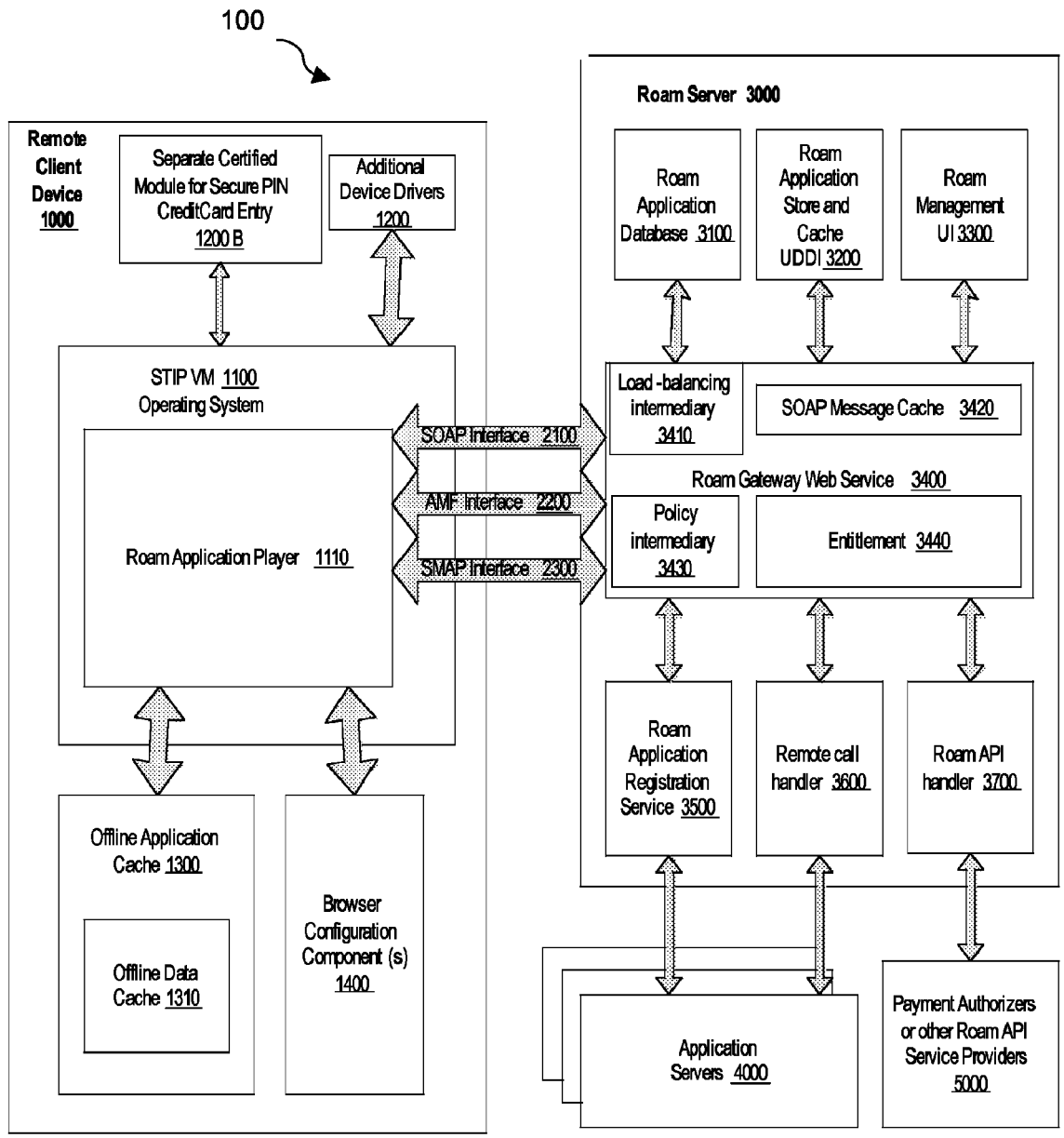
FIG. 2 is a detailed diagram of the system architecture of FIG. 1.
Figure 3:
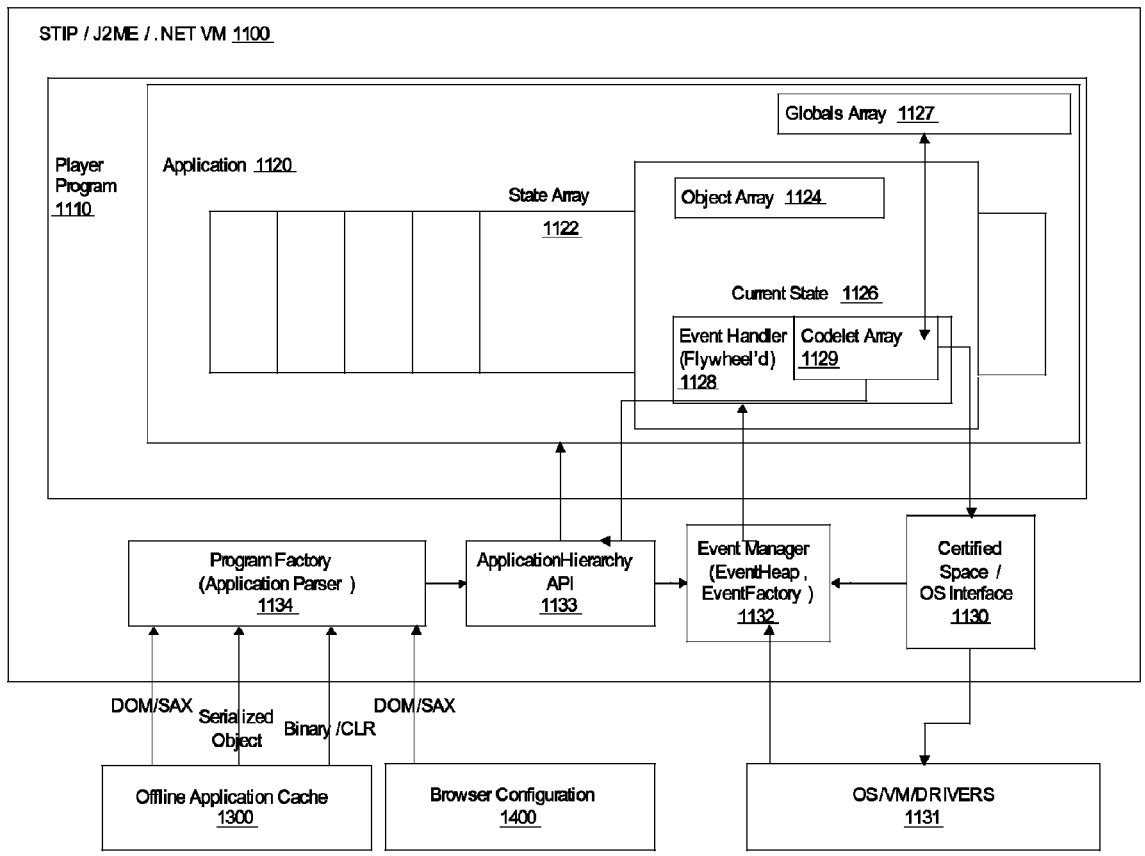
FIG. 3 is a detailed diagram of the application player architecture.

Referring to FIG. 2, FIG. 3 and FIG. 5, remote client device 1000 includes an operating system or managed code environment 1100 in which application player 1110 is executed. In one example, the application player 1110 is written in C and is executed directly by an operating system such as Windows CE. In another example, the application player is written in C# and is executed by a managed code environment such as Compact .NET, which is executed by an operating system. The managed code environment 1100 is in contact with device drivers 1200 and optionally with a secure payment module 1200B. Device drivers 1200 are any hardware access layer modules that allow the player 1110 to access peripheral devices such as card readers or printers. Application player 1110 is in contact with browser configuration components 1400 and an offline application cache 1300 with its associated offline application data 1310. The application player 1110 requests functionality from the server-side intermediary 3400 through XML messages embedded in Simple Object Access Protocol (SOAP) requests and then interprets the XML messages it receives embedded in SOAP responses from the server-side intermediary 3400. The application player 1110 has access to a local list of applications it is authorized to request and relevant security keys and settings. The server-side intermediary 3400 receives the XML messages embedded in SOAP requests from the player 1110 and sends to the player 1110 XML messages embedded in SOAP responses. As mentioned above, the format of communications between the application player 1110 and the server-side intermediary 3400 is XML and the communication connection is via a SOAP interface 2100. The system also includes one or more remote non-graphical web services, which are located on the network on additional application server 4000 and can potentially be displayed graphically as RIAs on the player 1110.

In one example, the managed code environment 1110 is a Small Technical Interoperability Platform Virtual Machine (STIP VM). Other examples of the managed code environment 1100 include Java 2 Platform Micro Edition (J2ME), .NET and Flash Lite, among others. Operating environment 1100 provides a way for the player 1110 to access operating system resources. The managed code environment 1100 executes the application player 1110, which is in contact with browser configuration components 1400 and an offline application cache 1300 with its associated offline application data 1310. Offline application cache 1300 is a set of applications (XML files) that this player instance has downloaded. Offline data cache 1310 is the set of stored web service calls that each application has saved for later execution on the application server host. These stored web service calls enable the offline functionality. Browser Configuration Components 1400 is a set of device-specific parameters that the player 1110 and its applications use to tailor the users experience of applications. These configuration components are locally stored name-value pairs that can be managed both locally and remotely via the server 3000. Examples of browser configuration parameters include, maximum size of the offline cache, auto-player-update on/off, auto-application-update on/off, and debug logging on/off, among others. The use of an application player rather than attempting to run RIAs directly on the client device provides platform independence for the RIA, enables functionality even when off-line, and abbreviates the length of the application certification process.

Referring again to FIG. 2, server 3000 includes a server-side intermediary or Gateway web service 3400 through which all communications to and from the client device 1000 pass. The server-side intermediary 3400 has access to a database with a table that associates Global Unique Identifiers (GUIDs) with remote web services and a table specifying which web services are authorized for which players. The Gateway web service 3400 comprises one or more server-side machines that act as intermediaries between the client device 1000 and the application servers 4000 which host the web-services that provide RIA functionality to the client 1000. These one or more server-side machines include a load-balancing intermediary 3410, a SOAP message cache 3420, a policy intermediary 3430 and an entitlement module 3440. The load-balancing intermediary 3410 is designed to facilitate the demands of numerous client devices 1000 simultaneously by dispatching requests evenly among the various server-side machines that comprise the server 3000. The SOAP Message Cache 3420 is a queue of SOAP messages to be executed by the server whose results will typically be passed back to a remote device 1000. The policy intermediary 3430 ensures that only authorized users on authorized client devices can access RIA functionality. The entitlement module 3440 controls the access that a request has to the resources it desires. Fine grained web service access control is enabled by this entitlement module.

The Gateway web service 3400 is in communication with an application database 3100, an application store and cache 3200, a management UI 3300, an application registration service 3500, a remote call handler 3600 and an API handler 3700. The application database 3100 includes a set of application XML files representing the currently available applications in the system. The application database 3100 cross-references Globally Unique Identifiers (GUIDS) sent by the client application player 1110 with the XML user interface of the requested RIA. The application store and cache 3200 is an interface into the application database 3100 that conforms to the Universal Description Discovery and Integration (UDDI) discovery standards for machine readable service functionality discovery. Management User Interface (UI) 3300 is a set of web application screens that allow data center administrators to control the use of the system, for example, allowing or disallowing access to a particular web service, or promoting an application from test to production. The Application Registration Service 3500 is the module that allows the developer to publish an application from the Integrated Development Environment (IDE). The remote call handler 3600 executes properly authenticated web service calls and the Application Program Interface (API) handler 3700 is an interface that external services 5000 (like payment processors) implement in order to be accessed from within the system. There is no logical distinction between API implementers and web service providers—it's an implementation mechanism that allows developers to get at, for instance, a DLL deployed on the server without web service wrapping around it.

Server 3000 securely handles interaction between the client 1000 and the application servers 4000 which host the web services that provide calculations and other functionality to the RIA, and between the client 1000 and any supporting applications 5000. All data processing and other calculations and manipulations are executed by web services hosted on application servers 4000. The user's experience of the RIA on the client 1000 comprises only display of an XML user interface (UI) and subsequent display of application results, also received in the form of XML.

Server 3000 provides a single, secure, access-controlled and actively managed channel from the application running on the device to the (one or more) web services exposed by the enterprise. Since the player 1110 communicates only with the server 3000, applications running on the client device 1000 cannot connect with unauthorized web applications and are therefore secure. The system is secure along all links via the use of industry standard link encryption and access controlled at all interfaces via the use of industry-standard user authentication. Link encryption refers to communications security protocols that encrypt and decrypt all traffic at each end of a communications line. Examples of industry standard link encryptions include secure HTTP (S-HTTP), web-services security (WS-S) and Way Systems Secure mobile application platform (WS-SMAP), among others. User authentication refers to the process of establishing or confirming the digital identity of a user or device such as the client device 1000 or the servers 4000 and 5000. Examples of industry standard user authentication include WS-S, lightweight directory access protocol (LDAP) and proprietary device authentication, among others.

Web services at the enterprise level are not inherently categorized or organized into any hierarchy that differentiates one from the other. Without an access-controlling mechanism, all users have equal access to all Web services. This is undesirable in a situation where server-oriented architecture (SOA, web services) is implemented as an enterprise initiative covering all systems from mission-critical data center application administration to unrestricted public information portals. Existing mechanisms for access-control rely either on internal implementation within each web service, or are limited to the system that is hosting the web service. In the present invention, server intermediary 3000 provides fine-grained access control over web service (WS) access organized by remote-user and remote-device that spans multiple WS hosts and organizations and requires no instrumentation of the individual web services. As was mentioned above, the server 3000 maintains access-control lists that relate users and devices to individual web services and provide for granting and denying access by those users to those services. These lists contain the unique combination of GUIDS and the identity of remote web services available to the client device 1000. Applications developed with the system IDE have, embedded within them, references to external web services. When these references are executed by a user running such an application, the server determines which external web service is being called, and checks a table of rights, internal to the server, that may, or may not include a record granting that user the right to access that external web service. If the right is granted, the call proceeds and the application proceeds along a normal execution path. If the right is not granted, the application generates an error-event which is handled by the application in whatever manner the application programmer deems best. Typically, it will generate an error message in the application, but in many cases, particularly in the mobile arena, the rights management mechanism can be used to induce the user to upgrade their service level—i.e. pay more money to the application provider.

A key feature of application security best-practice is the concept of non-repudiation. Non-repudiation is defined as the ability of a component to prove that a particular action of that component was driven by an interaction with another component rather than by some invisible, internal process of that component. The key enabler of non-repudiation is auditing, the storage of a trail of actions and data that can easily be used to reconstruct the interactions of the components of the system. The server intermediary 3000 provides a complete audit trail of the interaction of enterprise web services with the remote devices 1000, thus ensuring non-repudiation. This audit trail identifies the device, the user, time stamp and the details of the underlying remote connection to the device. In one implementation, fine-grained access control and auditing enable the server 3000 to bill users at an equally fine-grained level. This enables tiered service by enterprises implementing the system where users can be billed for individual calls within a session rather than at the more coarse system of billing for time spent within the application.

Figure 4:
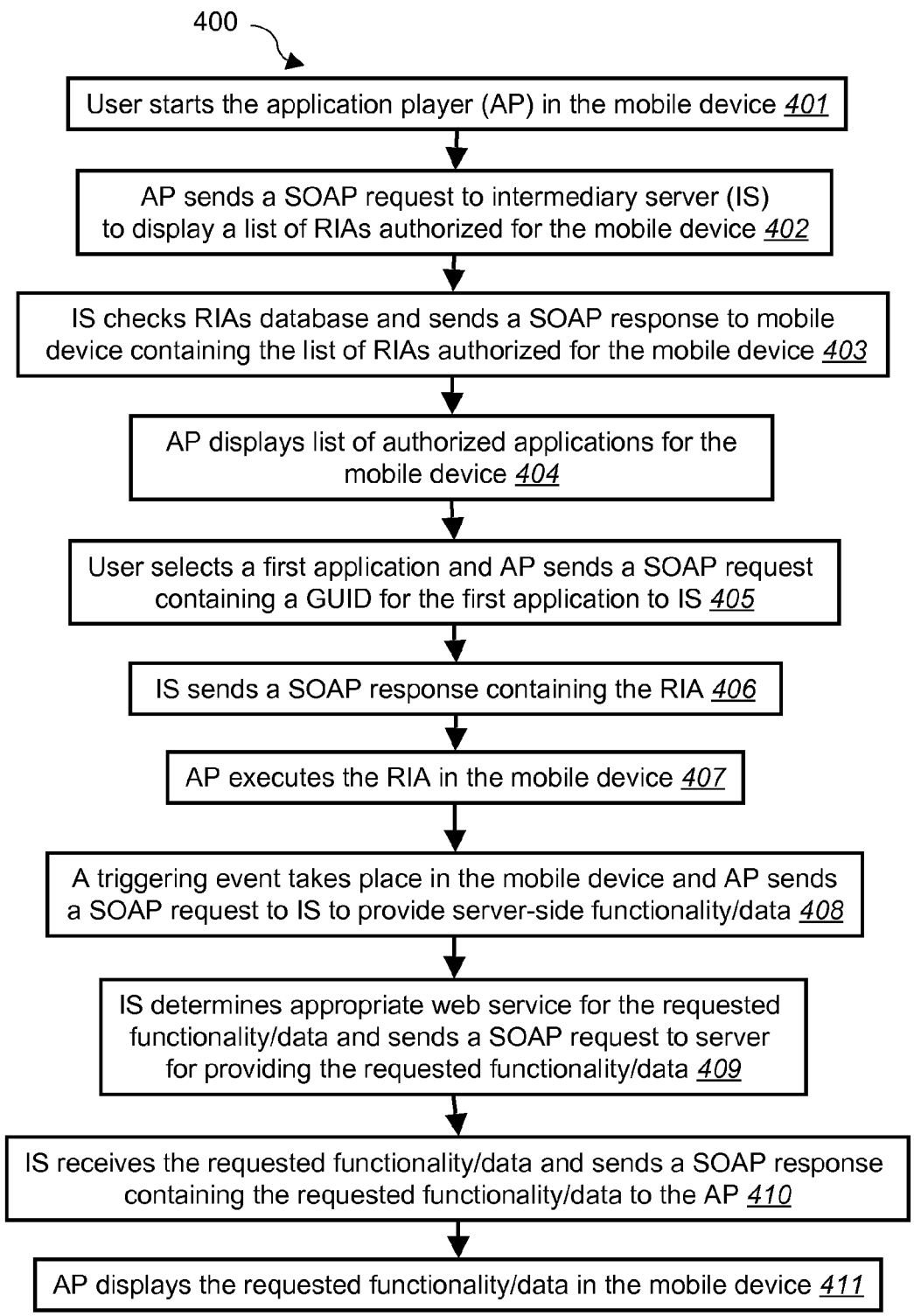
FIG. 4 is a flow diagram of the method of playing a RIA on a remote computing device.

In operation, a user executes the application player 1110 on the client device 1000. The application player 1110 consults first the offline application cache 1300 and presents a list of those applications which this client device 1000 and user are authorized to execute. Referring to FIG. 4, if the remote device 1000 and the server 3000 are both actively connected to the network, the process includes the following steps. First, the user executes the application player 1110 on the remote computing device 1000 (401) and then the player 1110 requests a list of authorized RIAs by sending a SOAP request (XML) that contains a GUID and relevant parameters to the server 3000 (a web service) (402). The server 3000 consults its database and sends a SOAP response that contains the list of applications to be displayed (403). The player displays the list by interpreting the XML embedded in the SOAP response (404). The user makes a selection from the list of available RIAs and the player requests the selected RIA by sending a SOAP request that contains a GUID and relevant parameters to the server (405). The server consults its database and sends a SOAP response that contains the RIA (XML file) (406). The player executes the selected RIA by interpreting the XML in the SOAP response (407). A triggering event takes place (e.g. the user twiddles a widget to activate RIA functionality, or a specified period of time elapses), and the player requests server-side functionality by sending the server web service a SOAP request that contains a GUID and relevant parameters (408). The server consults its database to determine what remote web service to call and sends a SOAP request containing parameters to the specified remote web service or services, potentially sending the output from one web service as a parameter to another (409). The server receives final output from the remote web service(s) and sends a SOAP response that contains the data to the player (410). The player displays the new information by interpreting the XML in the SOAP response (411). If the client device 1000 is not connected to the network the application player 1110 consults the offline application cache 1300 and displays the user interface of a selected application. User interactions with this interface comprise a web service request or requests to be stored in the offline data cache 1310 for transmission when network connectivity is restored.

The system architecture does not presuppose, and is not limited to, any particular physical network or any single network driver stack. All system components are "applications" in the Open Source Initiative (OSI) model, riding on top of whatever network connectivity the underlying operating system provides. In the OSI model, they're consumers of Layer 7 (Application Layer) services. By relying on stateless connections, the system architecture assumes a lowest-common-denominator network functionality that presupposes only the ability to make a request and receive a response. A typical network connection between server 3000 to external web services is HTTPS/TCP/IP over the public Internet. This stack is also typical for the remote devices 1000 that support it. Examples of physical networks supported include, GSM, iDEN, D-AMPS, cdmaOne, PDC, CSD, PHS, GPRS, HSCSD, WiDEN, CDMA2000 1xRTT, EDGE, W-CDMA, UMTS, FOMA, CDMA2000 1xEV, TD-SCDMA, UMA, HSDPA, HSUPA, SONET, Ethernet, Ethernet V2, X.21, and ISDN among others.

If at the time when the user selects an application, the client device 1000 is connected to the network, the application player 1110 sends a SOAP request 2100 to the gateway web service 3400. This SOAP request 2100 contains a GUID indicating the web service(s) to be executed, any parameters to be passed to the service(s), and authentication information. Other implementations of the invention may replace the SOAP 2100 with Action Script Message Format (AMF) 2200 or SMAP 2300. SOAP interface 2100 is one of the potential mechanisms by which the player and server communicate. Only one of 2100, 2200 or 2300 is used in any player deployment. SOAP is an object oriented Remote Procedure Call (RPC) formatted in XML. AMF 2200 is another communication protocol, currently favored by Macromedia Flash. SMAP 2300 is a communication protocol proprietary to Way Systems that includes transport layer and application layer functionality (i.e., authentication).

Referring to FIG. 5, web-service oriented applications for mobile device are mark-up language documents designed to be displayed in the application player 1110 of the mobile device 1000 and to be executed on the server 3000. The displayed UI collects input from the user and the mark-up language document specifies what to do with that input. The application formulates the mark-up language document into a SOAP message and forwards that message via the server 3000 to the web services 5000A and 5000C for processing. In one implementation of the invention, the application mark-up language documents are represented in an XML format. The XML format is deemed most expedient for development purposes because of its familiarity. However, the invention in no way depends upon or is restricted to this format for its implementation. A second embodiment, much less verbose, has already been implemented which produces a serialized version of the same application information.

Figure 6A:
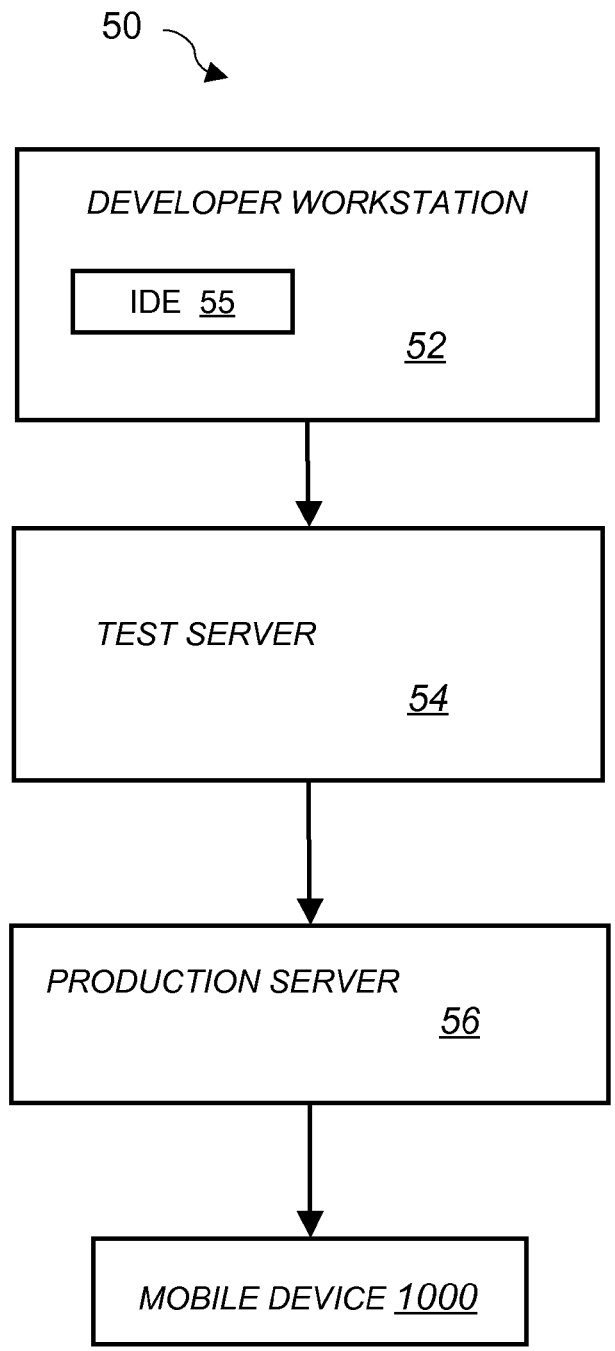
FIG. 6A is a block diagram of the system for developing RIAs with the IDE of this invention.

An IDE tool is used for developing the applications that are designed to run on system 100. Part of the ease with which applications are developed using this invention lies in the utilization of this software tool. Referring to FIG. 6A, the overall application development system 50 includes developer workstations 52 running a proprietary IDE tool 55, connected to a test server 54, which in turn is connected to a production server 56. Developers build applications with the IDE tool 55 and publish them to the test server 54. This publishing function distinguishes the system from other systems. Those applications are tested and pass quality assurance on the test server 54, then promoted to the production server 56 by a user with the appropriate administrator access. Typically, the business workflow of getting an application from development through test, quality assurance and into production is implemented via a disconnected series of scripts, each run manually by some individual developer/manager in the process. The server encapsulates all the business process workflow of developing, testing and deploying an application into a single integrated solution allowing administrators to monitor and control that process through a graphical interface. The present system provides for the chaining of multiple special-purpose test servers in the deployment process, a key differentiator for enterprises that implement multi-tiered test and quality assurance processes.

Figure 6B:
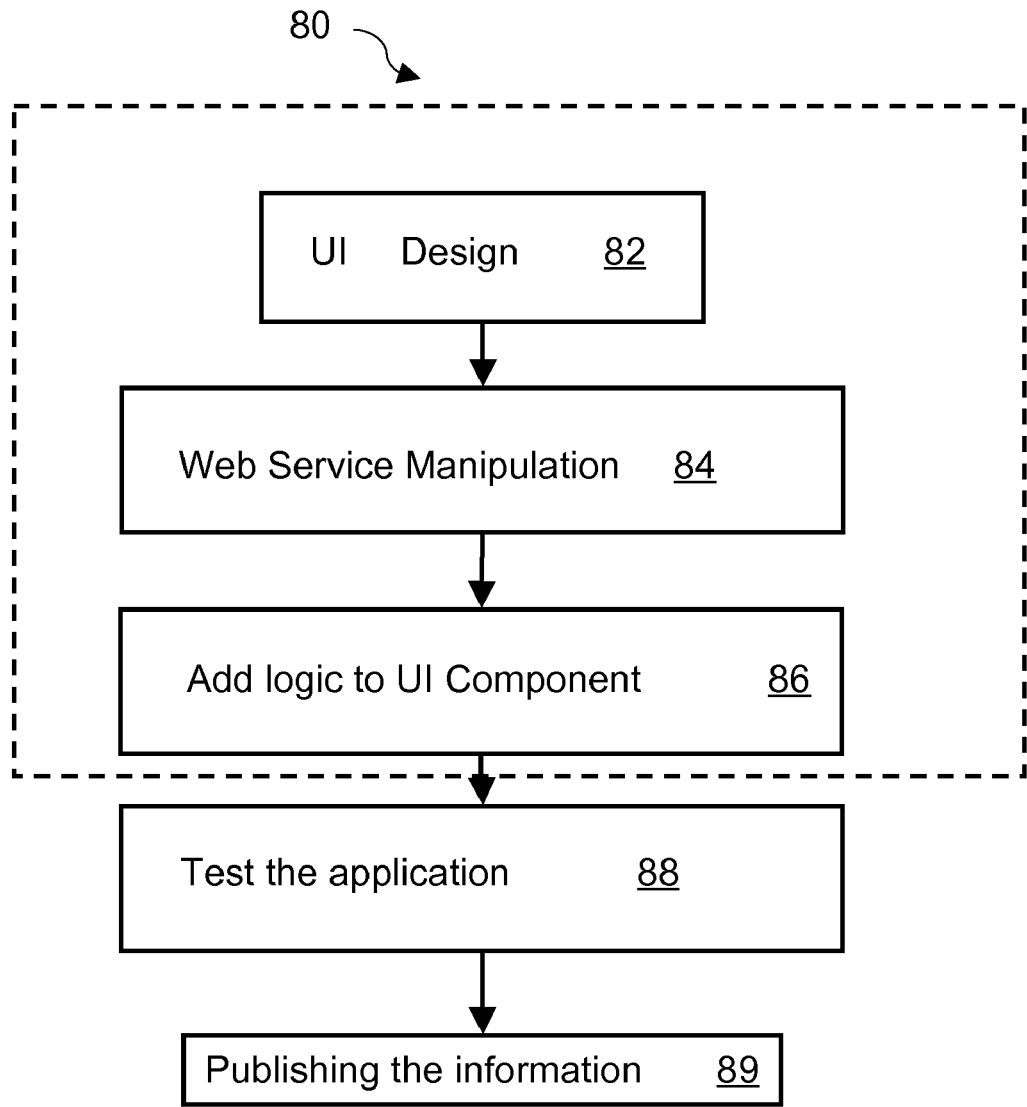
FIG. 6B is flow diagram for the method of developing a RIA with the IDE of this invention.

Referring to FIG. 6B, the process 80 of developing an application designed to run on the mobile device 1000 includes designing the UI (82), manipulating the web services (84), adding logic to the UI components (86) with the IDE tool 55. The process 80 further includes testing the application (88) and publishing the application (89).

Figure 7:
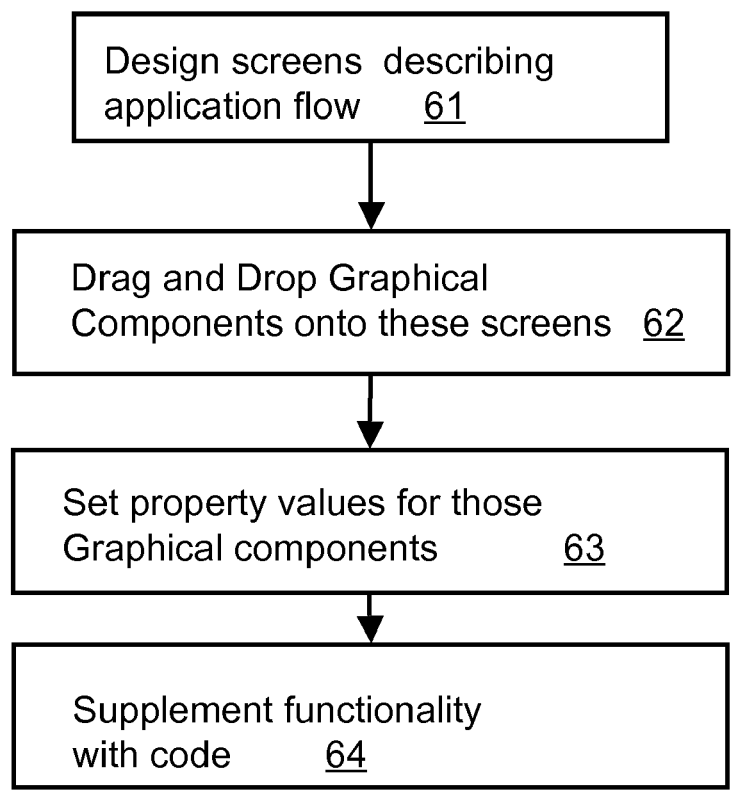
FIG. 7 is a flow diagram for the UI design process.

Referring to FIG. 7, designing of the application UI (82) includes the steps of designing screens/displays that describe the application process flow (61), then dragging and dropping graphical components onto those screens (62) and then setting attribute values for those graphical components in order to create functionality (63). In cases where additional functionality is required (i.e. where functionality is needed in addition to what can be specified by setting attributes alone), that functionality is supplemented with explicit code (64). The code may be in the native XML format, or in a script language, which may translated into that native format using the traditional methods of compiler design.

Figure 9A:
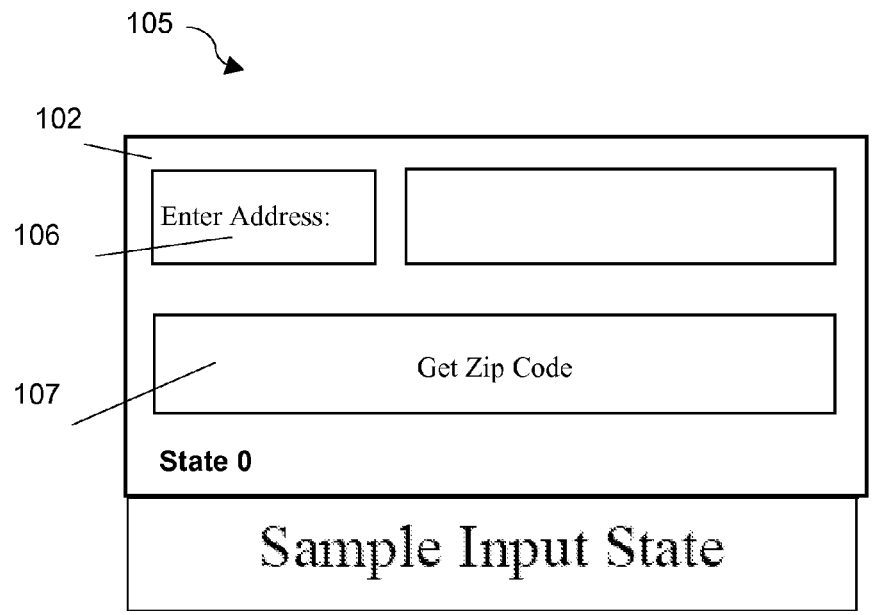
FIG. 9A depicts an input UI state of a RIA according to this invention.
Figure 9B:
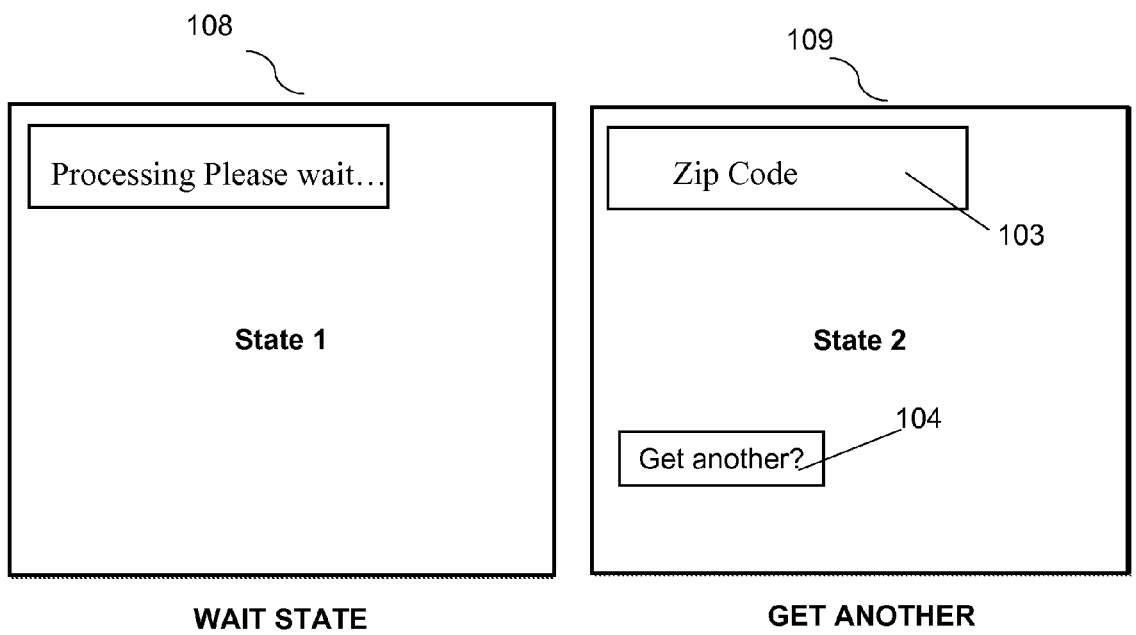
FIG. 9B depicts a processing and an output UI state of a RIA according to this invention.
Figures 10A, 10B:
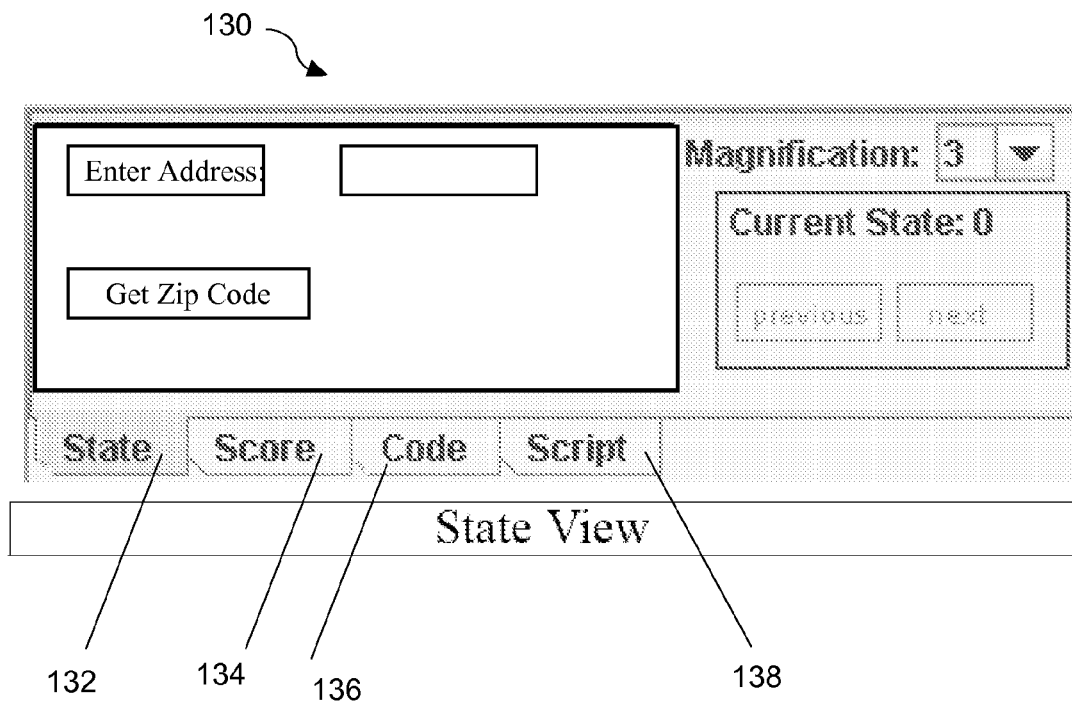
FIG. 10A depicts a state view of an input UI state of a RIA according to this invention.
FIG. 10B depicts a score view of a RIA according to this invention.
Figure 10C:
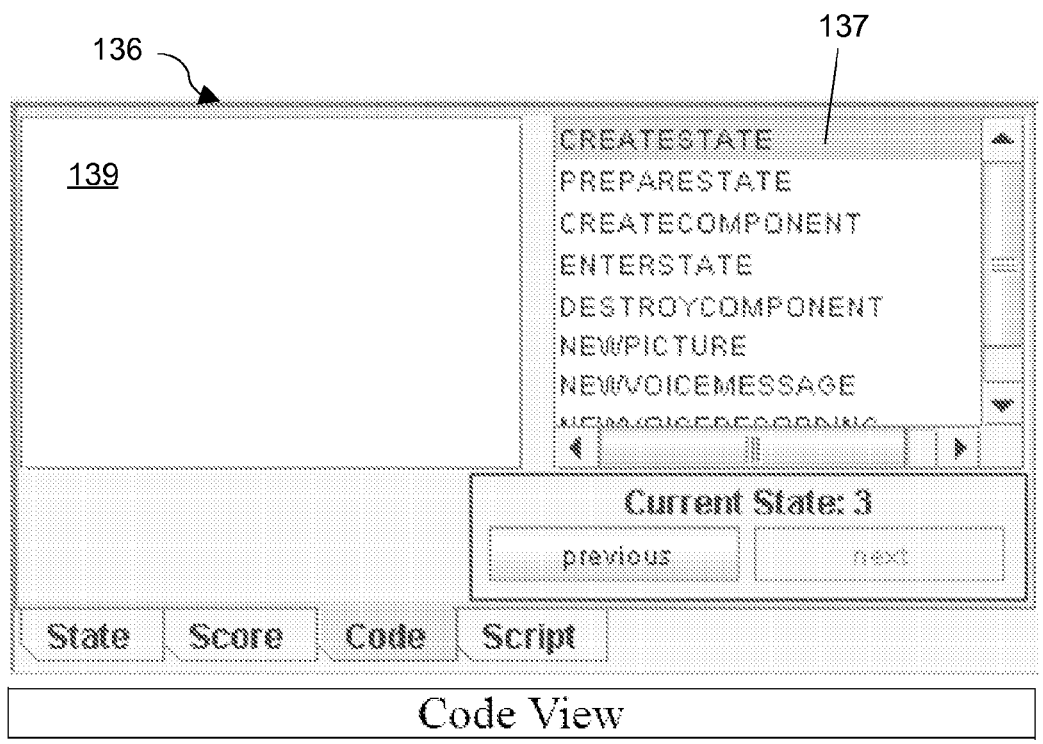
FIG. 10C depicts a code view of a UI state according to this invention.

The application process flow includes a series of displays called "states". Each state includes a series of controls and information displays designed to perform some part of the application's overall functionality. Referring to FIG. 9A and FIG. 9B, an application designed to return the zip code for a particular street address includes state 0 (105), state 1 (108) and state 2 (109). State 0 is a screen 102 that includes a text input box 106 labeled "Enter Address" and a selector 107 labeled "Get Zip Code". Text box 106 is used to type the address and the selector box is clicked to initiate the processing of the web service that will return the zip code information. State 1 is a transitional screen with a box labeled "Processing please wait" (108). State 2 includes a text box label 103 displaying the zip code and a selector 104 labeled "Get Another". Clicking on the selector 104 returns the application to state 0 screen. The application developer views and manipulates the controls and displays on an individual state of an application by looking at the IDE's state view 130, as shown in FIG. 10A. The state view displays the visual aspects of the application, one state at a time. Other views include the score view 134, shown in FIG. 10B, the code view 136, shown in FIG. 10C, and the script view 138. The score view 134 displays a table organizing the components of the application by state 137 and channel 133. The listing order of a component in the channel column 133 determines the order in which the components appear on the screen. Components are dragged directly from the toolbox 110, shown in FIG. 11A, and placed in the desired channel 133 and the desired state 135 in the table of FIG. 10B. The components may also be dragged from one cell to another, thereby changing state and/or channel. The code view 136 displays the code associated with a single component. The applications developed with the IDE of this invention are event driven. These events may be user-generated, automatic or procedural. User-generated events include events such as clicking on a selector or a button. Automatic events include occurrences such as a timer running out and procedural events are occurrences triggered explicitly within the application code. The code view allows the developer to specify the event types to which the application will respond. The event type is specified by simply selecting an event type from an event list 137. The desired commands are then typed in the workspace 139, shown in FIG. 10C. The script view displays the script associated with a single component and allows the developer to view and manipulate script instead of XML.

Figures 11A, 11B:
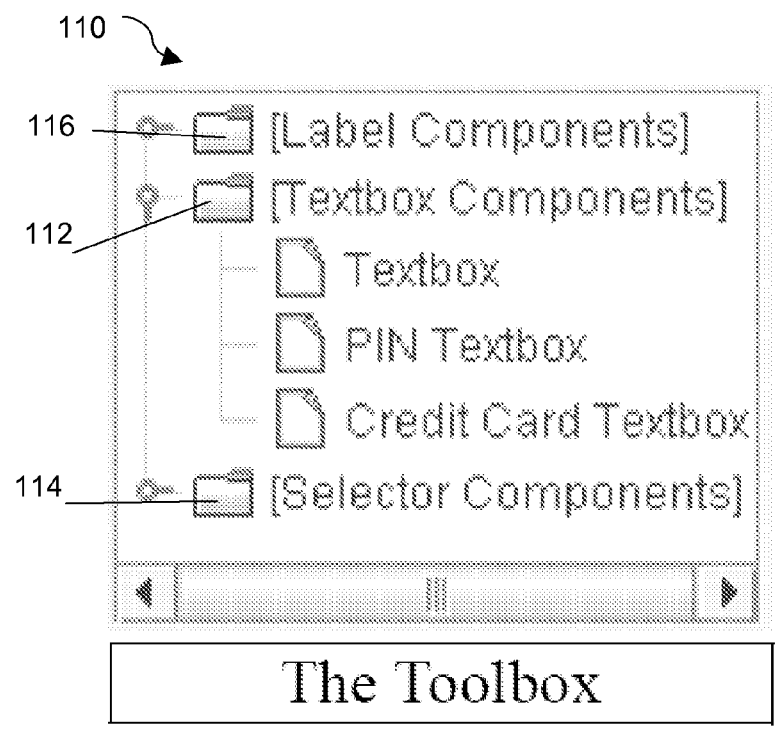
FIG. 11A depicts a toolbox of the IDE.
FIG. 11B depicts a property table of a graphical component of the IDE.
Figure 12:
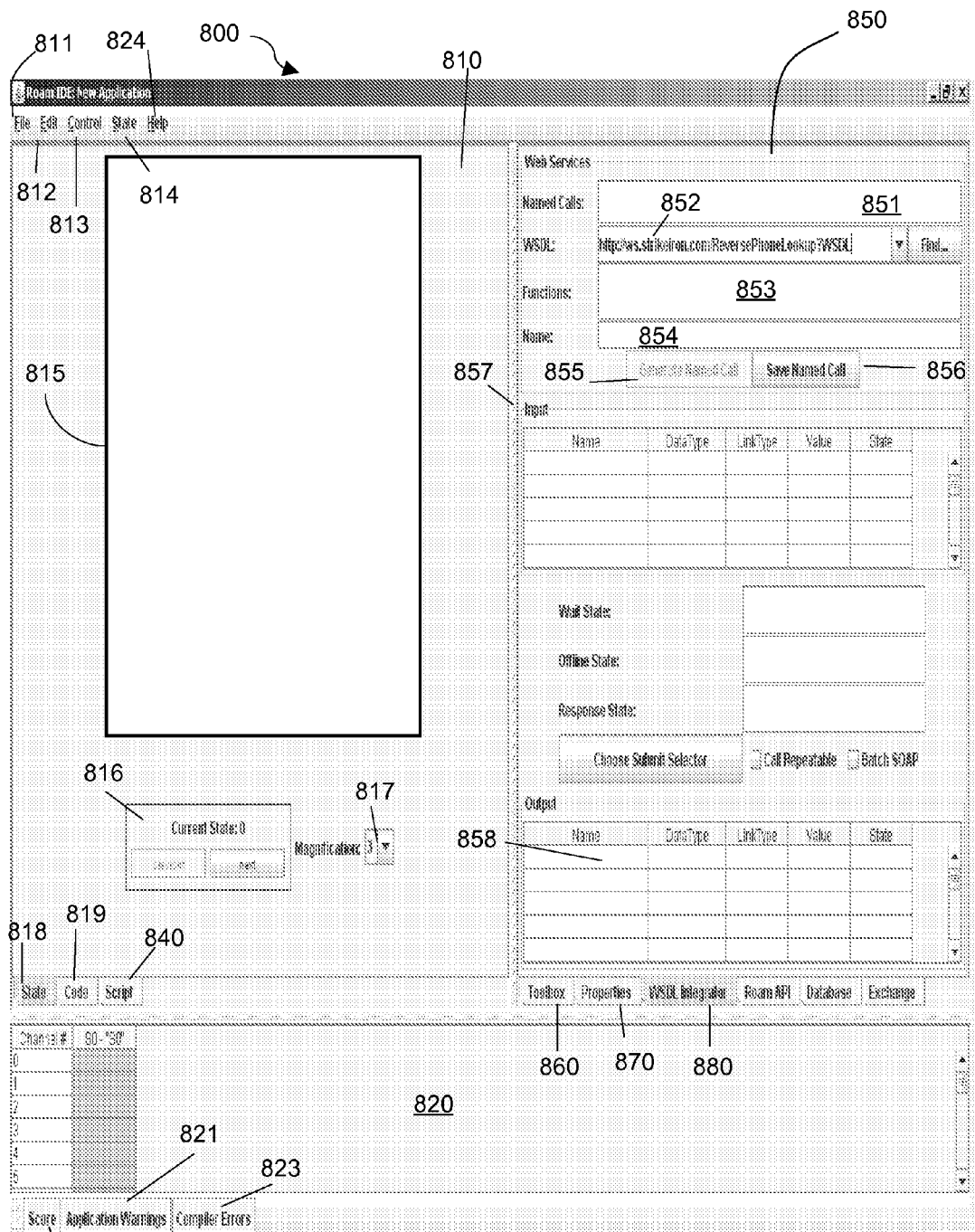
FIG. 12 depicts the IDE screen for a new RIA application.

The IDE provides various types of visual objects for use in the application development. Referring to FIG. 11A, the IDE toolbox 110 includes textbox components 112, selector components 114 and label components 116. The properties 122 of each component are listed in the properties table 120, shown in FIG. 11B. In one example, the component properties 122 include the name of the component (ID), location (X-Y coordinates), dimensions (height and width), text, style, visible or not, line properties, header properties, alignment, among others. The values for each component property are set by typing in the value fields 124 of the table. Designing of the UI with the IDE is as simple as dragging these components from the toolbox 110 to the desired location of the screen. Referring to FIG. 12, the IDE new application screen 800 is divided into two large regions 810 and 850. The region 810 in the left includes tab controls that organize the various views from which a developer may inspect and edit the application. They include tab 818 for accessing the state view, tab 819 for accessing the code view, a tab 822 for accessing the score view and tab 840 for accessing the script view. There are also tabs 821 and 823 for accessing applications warnings and compiler errors, respectively. The region 850 on the right of screen 800 includes tab controls that organize various function sets used by a developer for adding detail and functionality to the application. They include tab 860 for accessing the toolbox, tab 870 for accessing the properties table, tab 880 for accessing a Web-Service-Description-Language (WSDL) Integrator. The WSDL integrator displays controls useful for incorporating web services into the application. The application menu bar includes file menu items 811, edit menu items 812, control menu items 813, help menu items 824 and state menu items 814. The file menu items 811 includes "new" for creating a application, "open" for opening an existing application, "close" for closing an open application, "save" for saving an application, "save as" for saving an application under a new name, "publish" for publishing an application, "exit" for closing the IDE, and settings for application name, server, author, version, among others. The edit menu items include, cut, copy and paste options. The control menu items include options for testing and debugging of the application. Testing of the application includes invoking an emulator for running the application.

Figure 13:
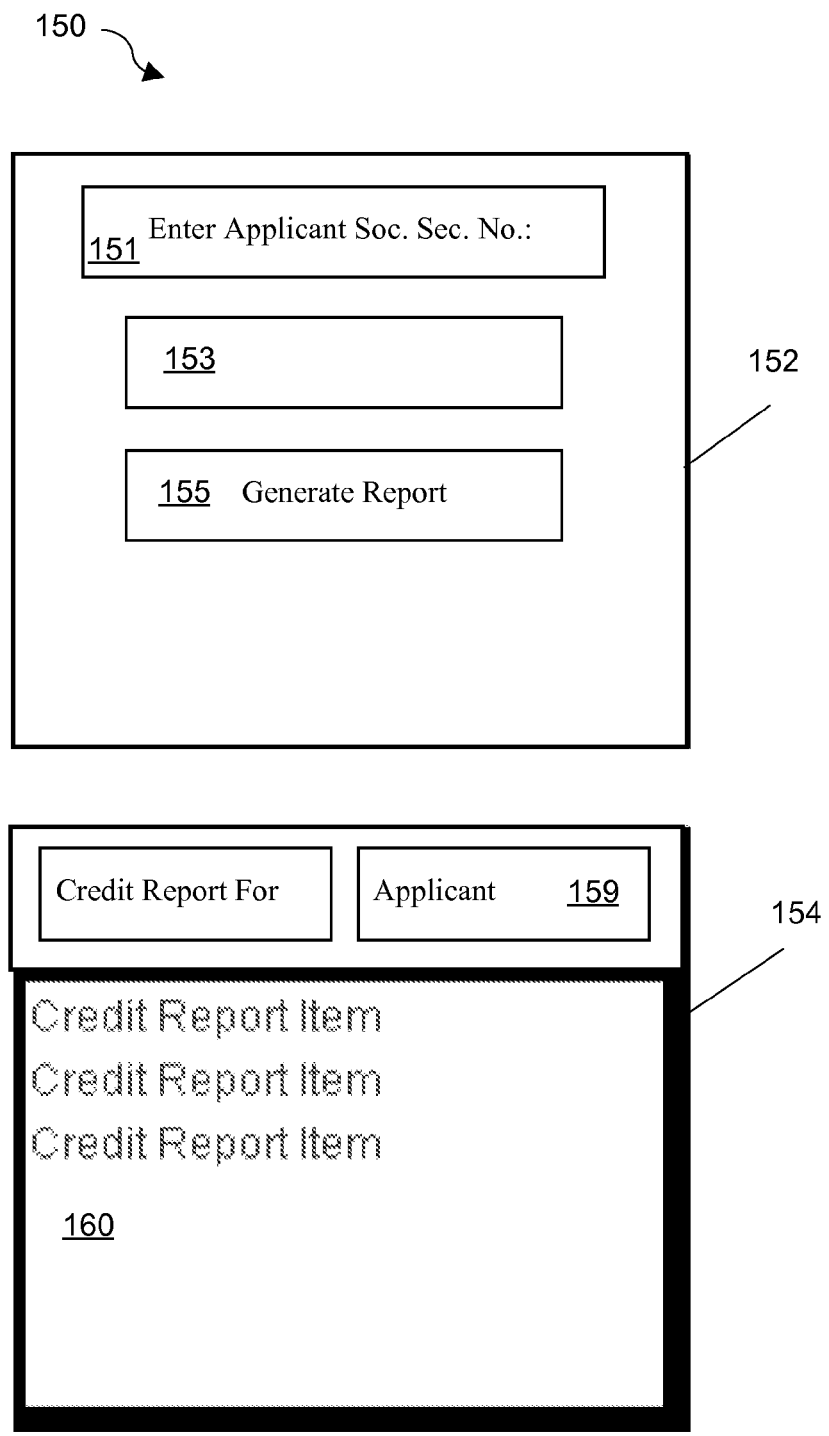
FIG. 13 depicts input and output UI states of a RIA.

Referring to FIG. 13, an application 150 developed with the IDE of this invention applies to a situation where a person seeking tenants for an apartment listing enters the perspective tenant's social security number and receives his credit report. The application is designed to run on the person's mobile phone. In this example, the apartment manager enters the perspective tenant's (applicant) social security number in text box 153 and clicks the "Generate Report" selector 155 on the input screen 152. The application creates a SOAP message containing the perspective tenant's social security number and addresses it to a web service able to cross reference credit information to social security numbers. A SOAP Sender object transmits the message to server 3000, which then relates the message to the appropriate web service. The web service looks up the requested credit data and transmits them back to server 3000 in SOAP form. A SOAP receive object receives the SOAP response from the server and the application 150 displays the information on the response screen 154. The credit information is displayed in listbox 160 and the perspective tenant's name is shown in box 159. The credit information remains secure because it is transmitted through the secure server 3000.

Figure 14:
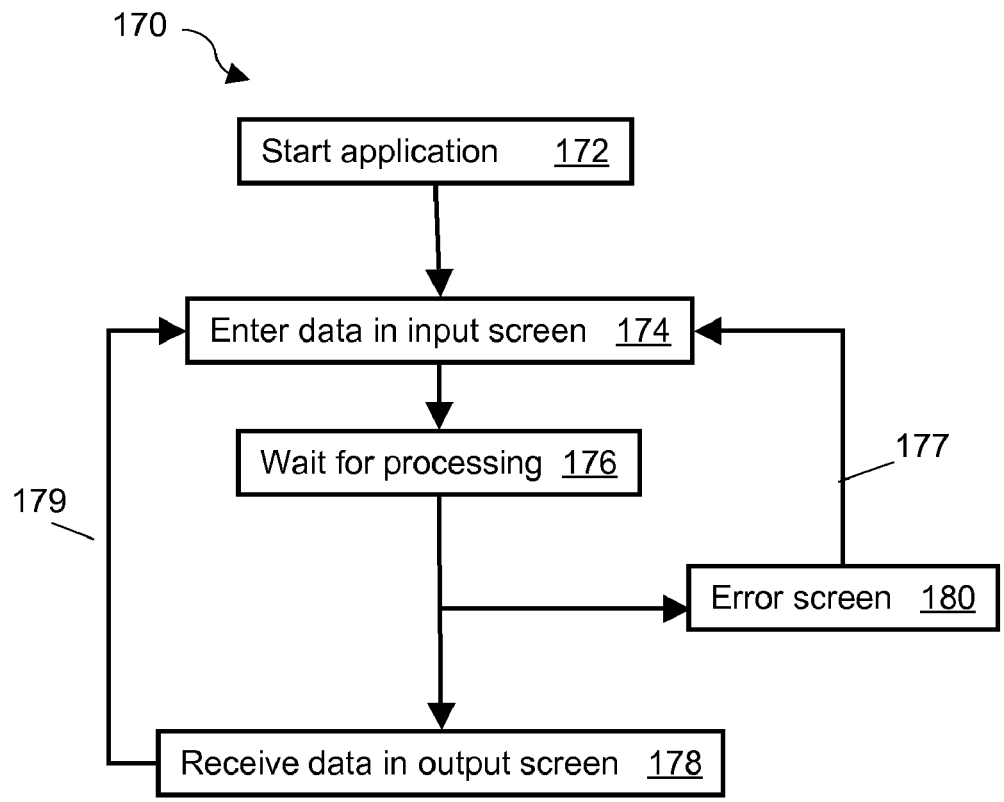
FIG. 14 depicts a typical RIA process flow according to this invention.
Figure 15A:
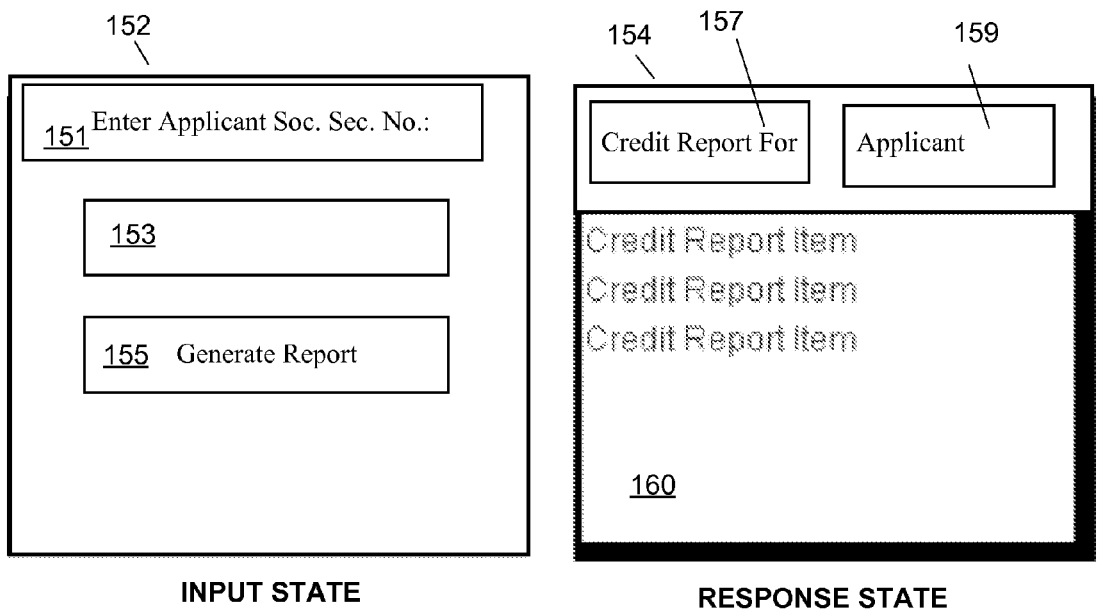
FIG. 15A depicts input and output UI states of a RIA.
Figure 15B:
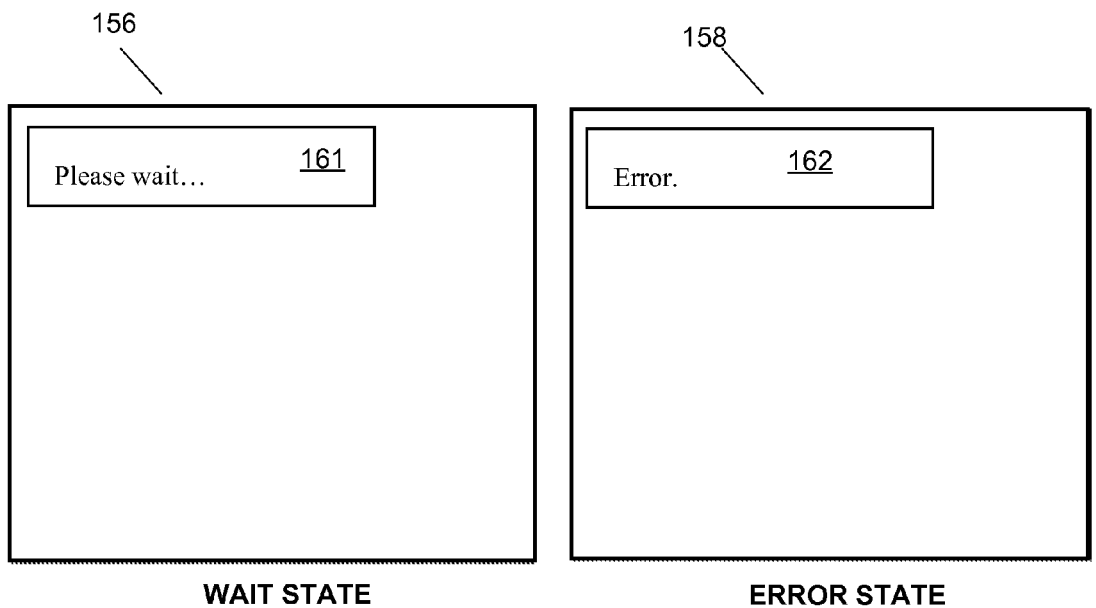
FIG. 15B depicts processing and error UI states of a RIA.

Referring to FIG. 14, the process flow 170 of application 150 includes starting the application on the mobile phone (172), entering data in the input screen (174), waiting for processing (176) and receiving the processed result in the output screen (178). If there is an error the application displays an error message (180) and has the option to correct the input and run the application again (177). The process may be repeated for a different input (179). This process flow is accomplished with the four screens/states shown in FIG. 15A and FIG. 15B. They include an input state 152, a response state 154, a wait state 156 and an error state 158. Creating the input state involves dragging components from the toolbox 110 into the state view. The components include a label 151 instructing the user to enter the applicant's social security number, a text box 153 where the user enters the applicant's social security number and a selector 155 that sends the data for processing. The look and feel of components 151, 153 and 155 are adjusted by changing their properties using the properties tab 870. States 154, 156 and 158 are created in a similar way.

Figure 16:
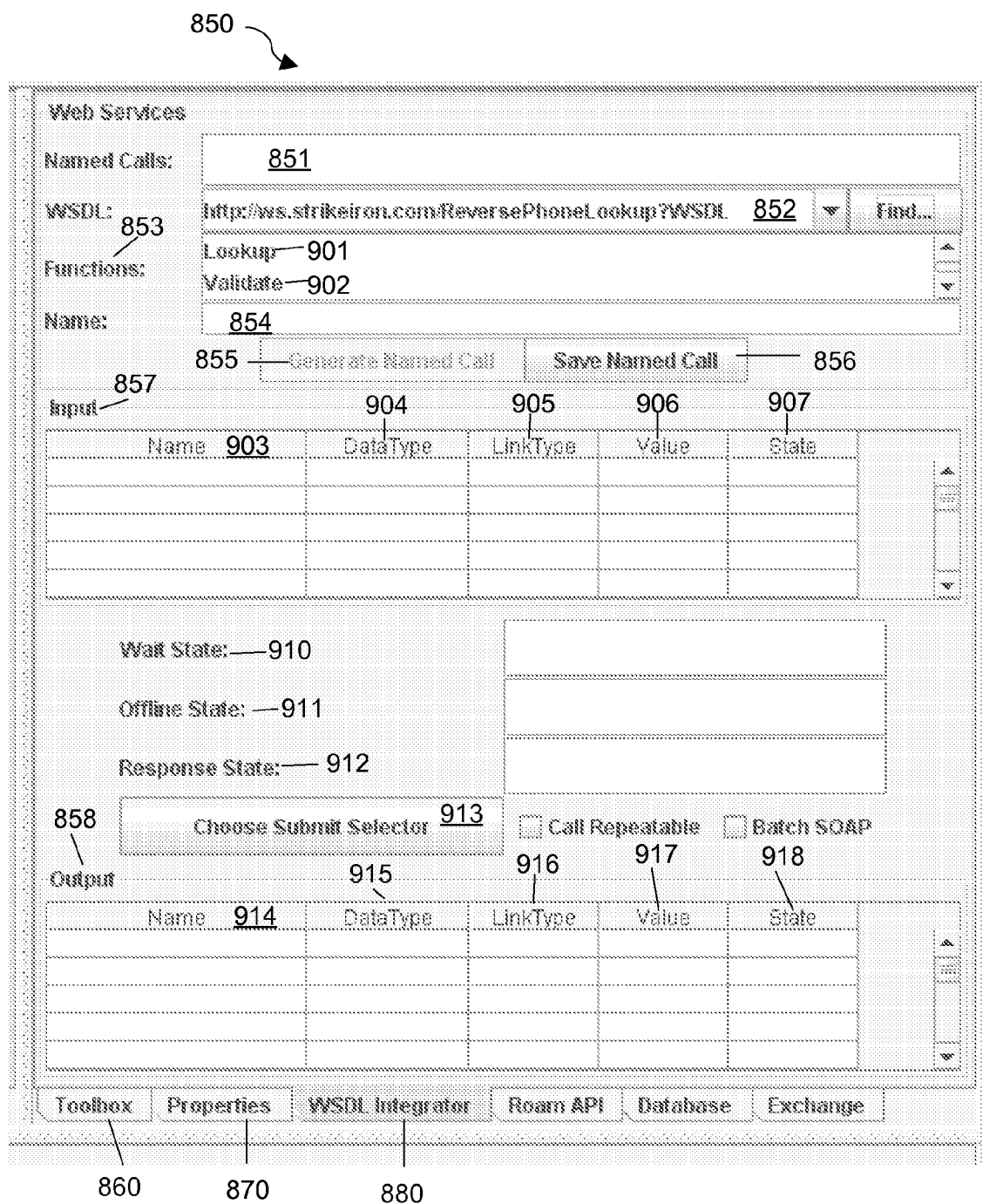
FIG. 16 depicts a WSDL integrator screen.

Most of the functionality of the applications is handled by the remote web-services. However, sometimes logic may be added directly. For this purpose, the IDE includes special functionality for generating widgets and associated program code for connecting to a specific web-service. This functionality is provided by a Web-Service-Description-Language (WSDL) integrator that reads the WSDLs describing the desired web service and presents the expected parameters in convenient tables. For manipulating a web service, the developer simply drags UI components to the web service function parameters with which they will be associated. Referring to FIG. 16 and FIG. 12, the WSDL integrator tab 880 includes an input field 851 for entering the URL of the requested web service. The URL may also be selected from a list of available WSDLs 852, in cases where it is not entered directly. The functions available from a particular web service (i.e., given by the selected WSDL) are displayed in the function box 853. The input and output parameters of each function are displayed in the input table 857 and output table 858, respectively. The parameters include name 903, data type 904, link type 905, value 906, and state 907.

In addition to the web-service input parameters, some web-services also require that specific information be submitted in the form of an XML header. Examples of information that might be placed in this header include account information and keys used to grant access or bill for the accessed service. The WSDL integrator portion of the authoring environment might also include mechanisms for providing this information by entering this information in directly ("hard-coding" it) and submitting it to the server to reproduce with every invocation of a given web-service call. Alternatively, the information is entered by providing links to account-information in the server database so that calls can be invoking the use of dynamic data, i.e. data suited to the particular user/session context for a given web service call.

Besides listing the functions available for a given web-service, the WSDL for that service describes named and typed input and output parameters for each function (similar to a method header in any typed computer-language). This information may be used to automatically generate a user interface around the given web-service call.

Figure 17:
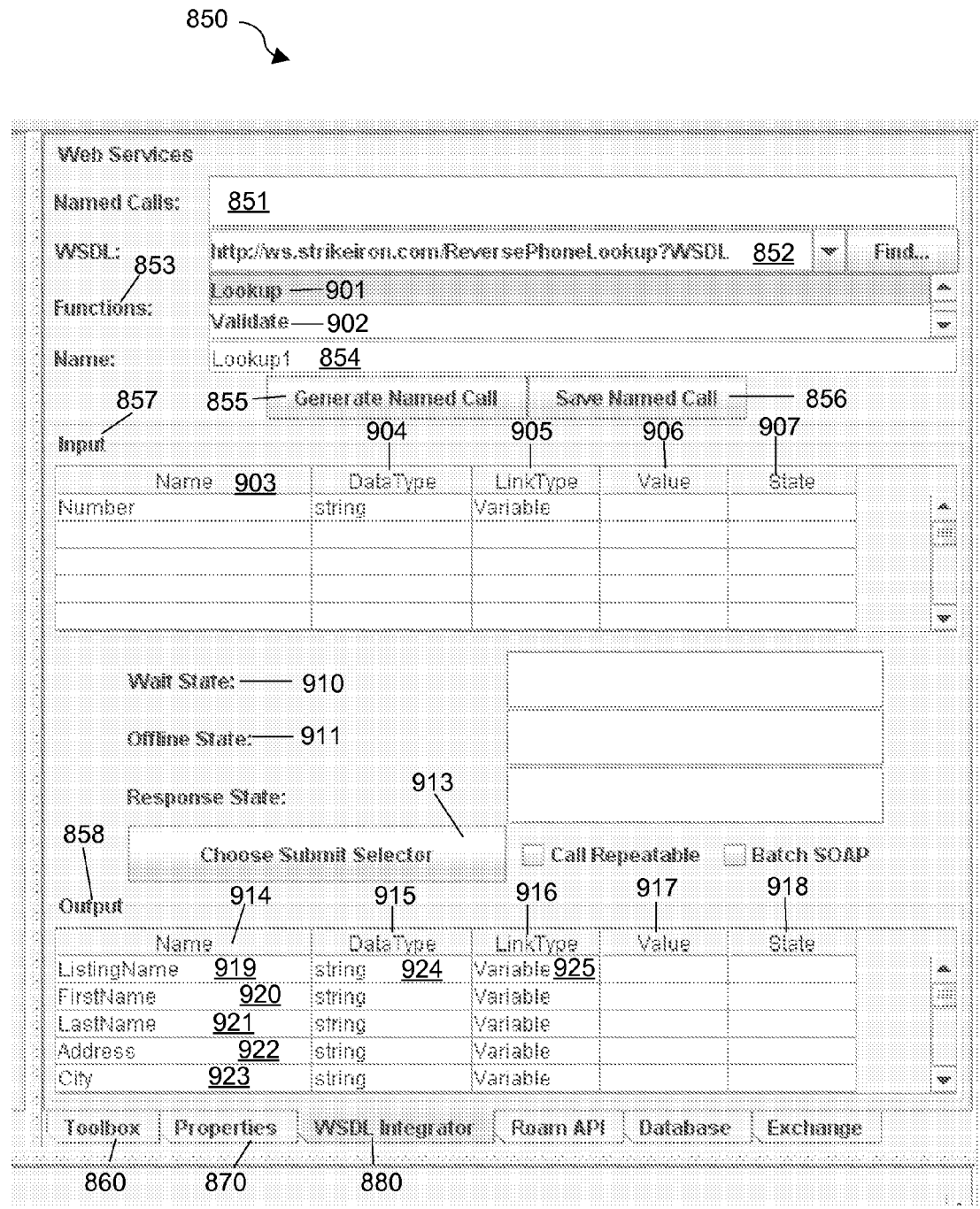
FIG. 17 depicts a WSDL integrator screen with input and output data.

Referring to FIG. 17, a web-service hosted by StrikeIron-.com contains a function, which takes a phone number and returns the listed address information for that address. The WSDL address call for this service is located at: http://ws.strikeiron.com/ReversePhoneLookup?WSDL.

Figure 18:
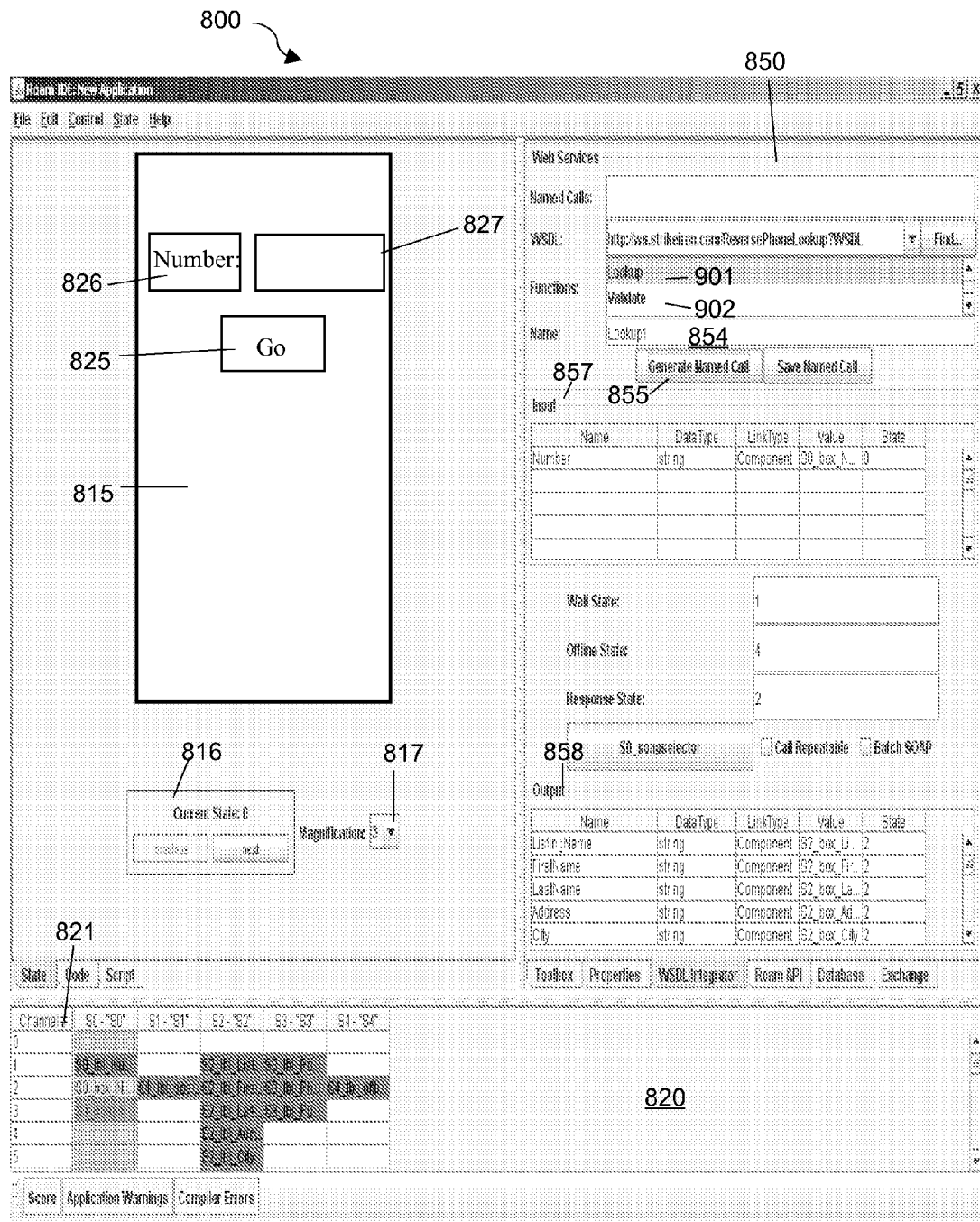
FIG. 18 depicts the IDE screen for an input UI state of a RIA.
Figure 19:
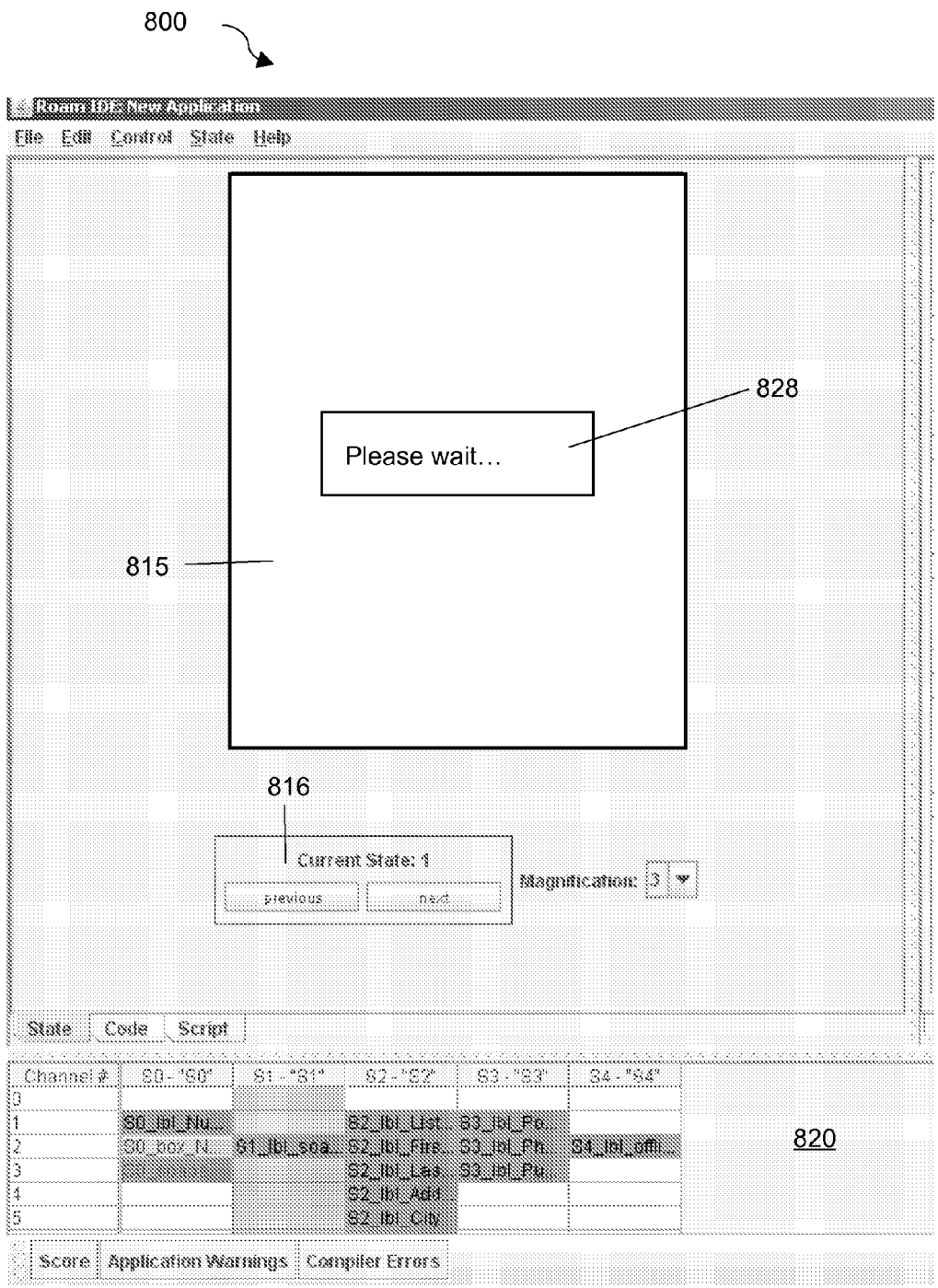
FIG. 19 depicts the IDE screen for processing UI state of the RIA of FIG. 18.
Figure 20:
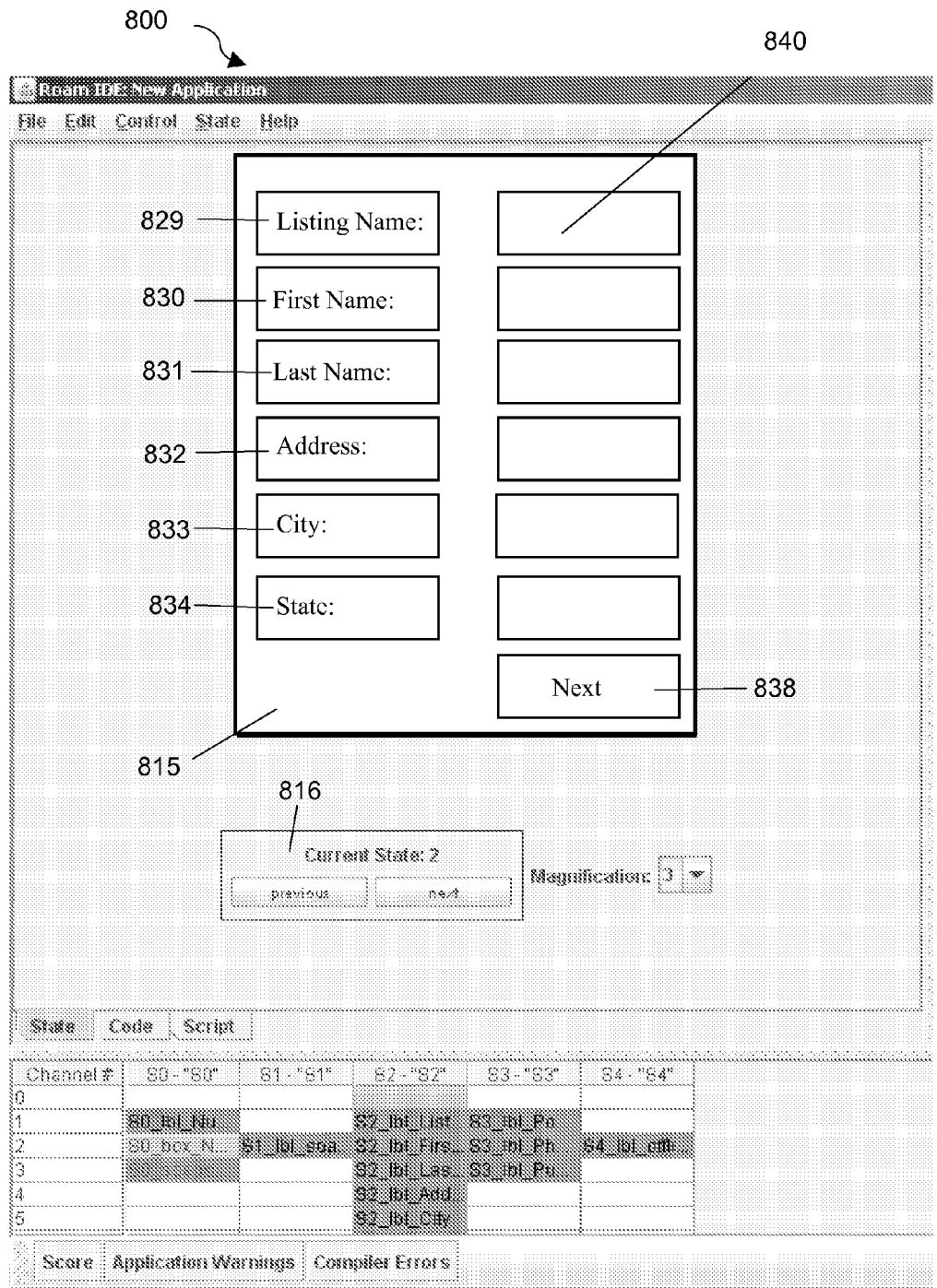
FIG. 20 and FIG. 21 depict the IDE screen for an output UI state of the RIA of FIG. 18.

The input is a string name. When the WSDL address is entered in box 852, the IDE makes an http call to get the WSDL description. From this call, it is able to get a list of supported functions, which it displays in a listbox 853. They include "lookup" 901 and "validate" 902. For each selected function the IDE computes the input and output parameter names and types. The input and output parameters are listed in grids 857 and 858, respectively. Grids 857, 858 include the parameter names 914, 903 and types 915, 916, 917, 918, 904, 905, 906 and 907. The user can either drag widgets/components from an existing UI into the grid to establish an association or simply click a button to generate the UI automatically. Referring to FIG. 18, when the "Generate Named Call" 855 button is clicked, a label 826 and an edit box 827 are created for each of the input fields in the input screen (state 0). These are spaced across multiple screens if space requires it. Also, a go button 825 is created for initiating the call. The button or selector that triggers the web service call is identified by dragging it from the state or score view to the button 913 marked "Choose Submit Selector". Next, SOAP sender and receiver components are created. The bottom 820 of the screen displays the score view of the application which provides an overview of the application, with each column corresponding to one state or view of the application and the rows in that column corresponding to the widgets/components used in that state. Next, a screen (state 1) with a label 828, "please wait" to display while the SOAP call is being executed, is created, as shown in FIG. 19. Referring to FIG.

Figure 21:
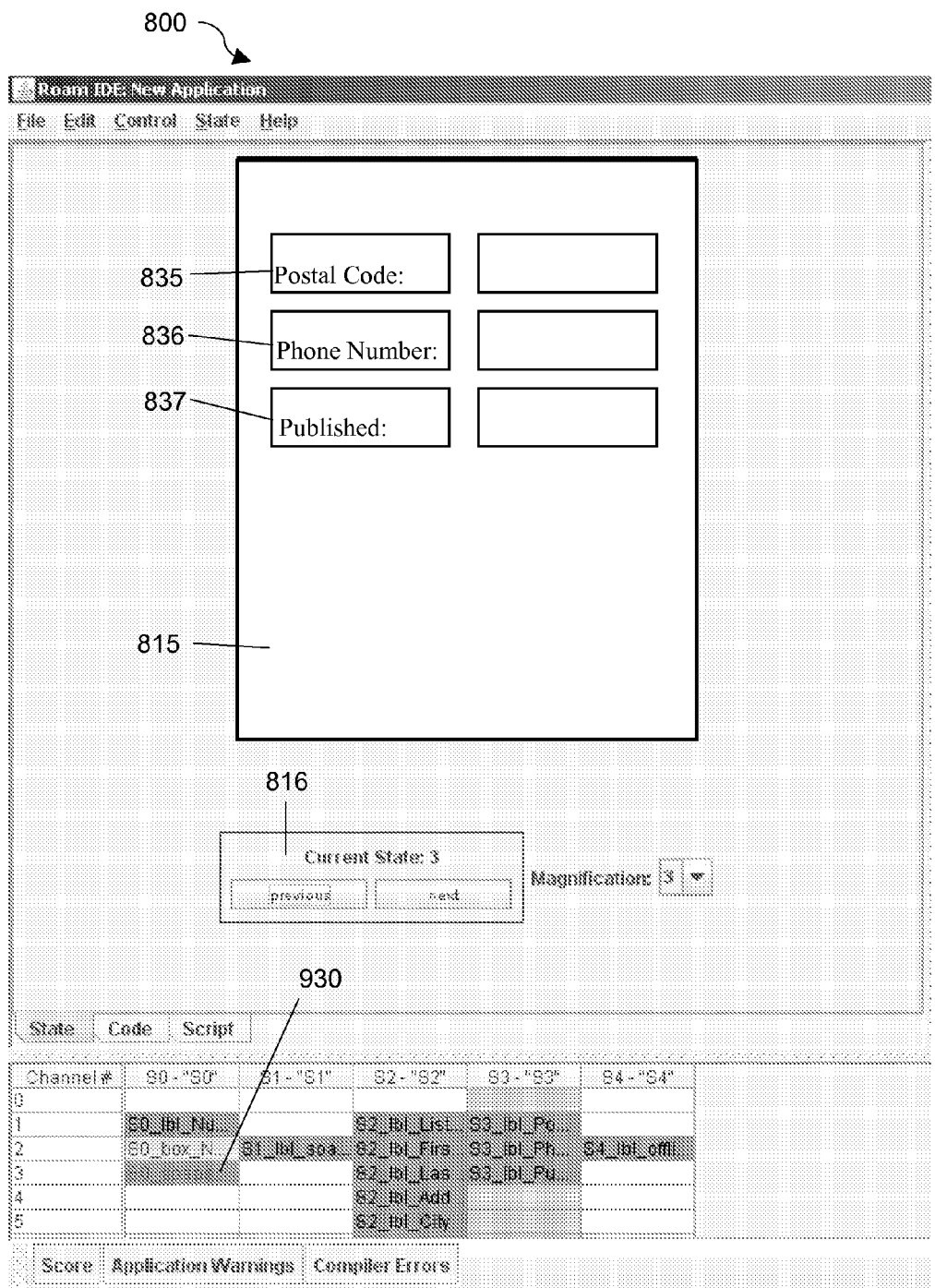
Figure 22:
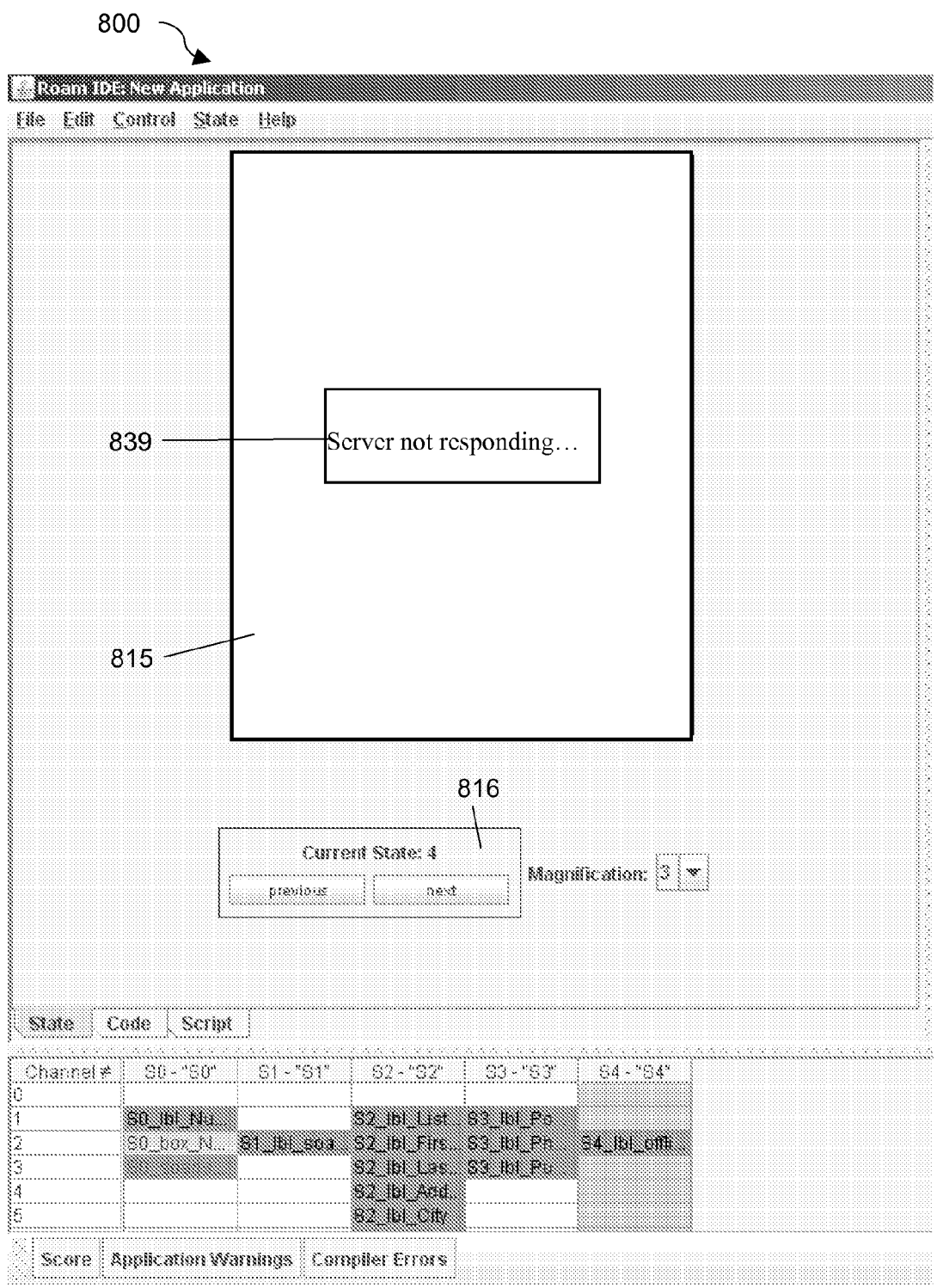
FIG. 22 depicts the IDE screen for an error UI state of the RIA of FIG. 18.

20 and FIG. 21, labels 829-837 for the output names and additional labels 840 for the output values are created for the output screens (state 2 and state 3). These are spaced across multiple screens if space requires it. The state number 816 and the UI screen magnification 817 are also indicated in screen 810. SOAP sender and receiver components are also created. Also a timer is created to measure seconds before timing out if there is no immediate response. SOAP sender and receiver components and the timer are generated automatically and are not visible components, i.e., they do not appear in the state view. However, they are still listed in the score view, see components 930 in FIG. 21. An additional screen (state 4) is created with a label 839 displaying an error message, shown in FIG. 22. This is used if the SOAP call is not returned. The code is executed on a click of the go button. The code is also executed on the SOAP receive and if the timer times out before a SOAP receive is returned.

Figure 8:
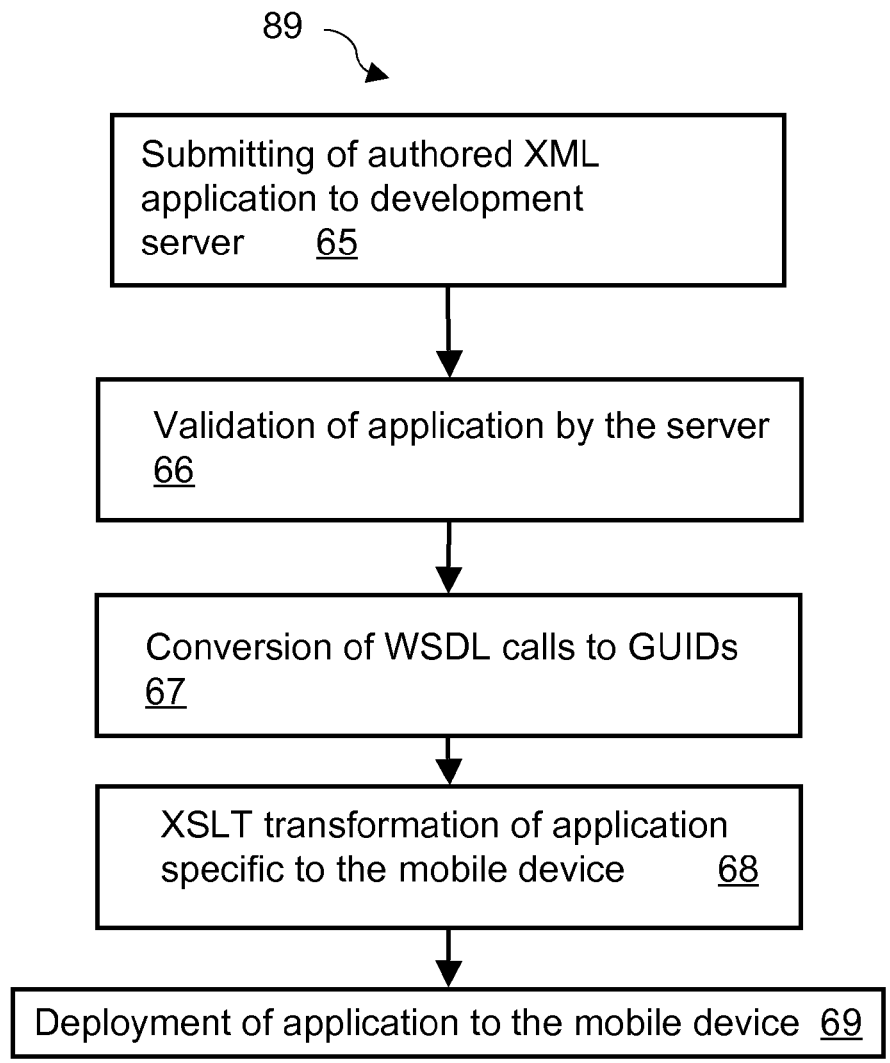
FIG. 8 is a flow diagram for the process of testing and publishing a RIA.

The IDE also includes functionality for "publishing an application": i.e. submitting it to the server for debugging, review and deployment (89). Referring to FIG. 8, publishing of the application 89 includes submitting the application 65, validating 66, converting 67, transforming 68 and deploying of the application 69. Upon completion of the authoring (or modification) of the application in the IDE, the IDE submits the entire XML representation of the application and an associated GUID to a development server (65). The development server makes sure that the application confirms to the current XML schema for the application and validates the application (66). The server then converts the WSDL calls to GUIDs and stores them in the database. Before saving the application to local data store, the server replaces all web-service calls with GUIDs and populates a database table preserving the mapping. For security reasons, the player always refers to web-service calls by their GUIDs and the server translates these GUIDs back into the actual calls at run-time (67). For each supported target device and platform, the server runs an XSLT on the application to get another file (which may be in XML or may be in some other format) stripped down to only the relevant information for that device (68). Next, the application is debugged by running it in conjunction with the development server. A human intermediary "promotes" an application from the development server to the deployment server where it can be accessed by players running on mobile devices. These devices request a new application (or query for a new version of an existing application if such exists) and, if appropriate, the server sends the device- and platform-appropriate version of the application to the device where it is then executed by the player (69).

The interactions of the application with the world (i.e. both client-side resources and resources on a network to which the server has access) through the server 3000 include the remote, server-based web services discussed previously, and four other interrelated concepts that allow access to information that does not have a web service (WSDL-described) interface. These four concepts include local client side resources, embedded client side resources, remote network based resources and local client side processes. Local client-side resources are resources/files that reside in the same device as the player. They provide the ability for an application to get a reference to a local file/resource (e.g. a photo image) and pass that reference to a ClientServiceCall for consumption by external web services. Embedded client-side resources refer to resources embedded in the executable code and packaged with the player. Remote network-based resources provide the ability to an application to get a file/resource (e.g. an image) from the network and display it locally. Local client-side processes provide the ability for an application to invoke an instance of a local process (e.g., a pocket calendar). Taken together, web services, processes and resources give application programmers complete access to anything they may require. While the bulk of the business logic and processing power of the system 100 is in web services, local processes and resources provide additional enabling functionality.

A resource is any lump of data used by an application that cannot be packaged with the application itself. Some examples of resources include image files, text files, icons, video, audio, web URLs, HTML pages, among others. Resources include named resources and dynamic resources. Named resources are created outside the application and live at well-known locations. Named resources may be remote or published. A remote named resource may have a refresh schedule associated with it such that it can be refreshed in the cache only as often as necessary, and potentially downloaded to the device at a point when the user experience is not downgraded. Dynamic resources are created by some action of the application whose name/location may vary. For example, a temporary file for use by the application is a dynamic resource. Named resources may be local (i.e., a resource that resides in the same device as the player), network (i.e., a resource that is retrievable by the server via a URL call), embedded (i.e., a resource that is packaged with the player) or published (i.e., a resource that is accessible by the IDE and published to the server for applications to retrieve).

The problem with resources is that most practical uses of resource require more local storage space than a mobile device typically has resident. For example, if an application uses ten images of 10 megabytes each, but the device only has 50 Mb of free storage, then at least half of the images will not fit on the device. Those images cannot all be resident locally all the time. Neither can the system wait and download those images over the network on-demand because they require more bandwidth than a mobile device usually has available. Downloading our example images at 10 Mb per image (for example) would take 217 seconds at 369 kbps downstream speed. This is far longer than a user usually waits for downloading an entire page, never mind a single image. Even at 1 Mb per image, waiting for 21 seconds still presents an unacceptable user experience. Therefore, the system includes a resource manager that manages the resources and maximizes the user experience with regards to resources by varying the local storage space and network bandwidth.

The resource manager includes a resource database of indexed resource metadata, an unlimited size cache of actual resource data on the server side and an aggressively managed cache of very limited size on the client side. The client and server resource manager components exchange resource metadata and the client resource manager—tuned to the particular device and platform—decides which resources to 'localize' (i.e., download) to maximize the user experience.

In the IDE, the developer describes all the resources he intends to use with his application prior to publication. Resources are intensively examined by the resource manager server component and metadata that affect throughput (size, compressibility) are stored and indexed. Resource usage in the system is very much analogous to database views in SQL. The programmer determines ahead of time which bits of information are available in a view, and how those bits of information relate to each other. The final view gives the user of that view a consistent, coherent interface to a set of data points that did not have one before.

Server side resource management is done by the Caching Proxy. The Caching Proxy is responsible for keeping cached copies of pre-identified resources from outside the system.

Unless a resource is defined as pass-through, any call from the device to the server for a remote resource should be served entirely by the server. Pass-through access is defined as a resource that must be retrieved fresh from the remote source every time the resource is referenced in the application. Pass-through resources are network intensive. The Caching Proxy always regularizes, and usually speeds up access from an application to a resource. All access from applications to external web services and network resources go through the server. The Caching Proxy speeds up access to a network resource by caching it locally at the server so that instead of 6-20 hops over heterogeneous networks, any resource is available within zero or one network hop.

Figure 23:
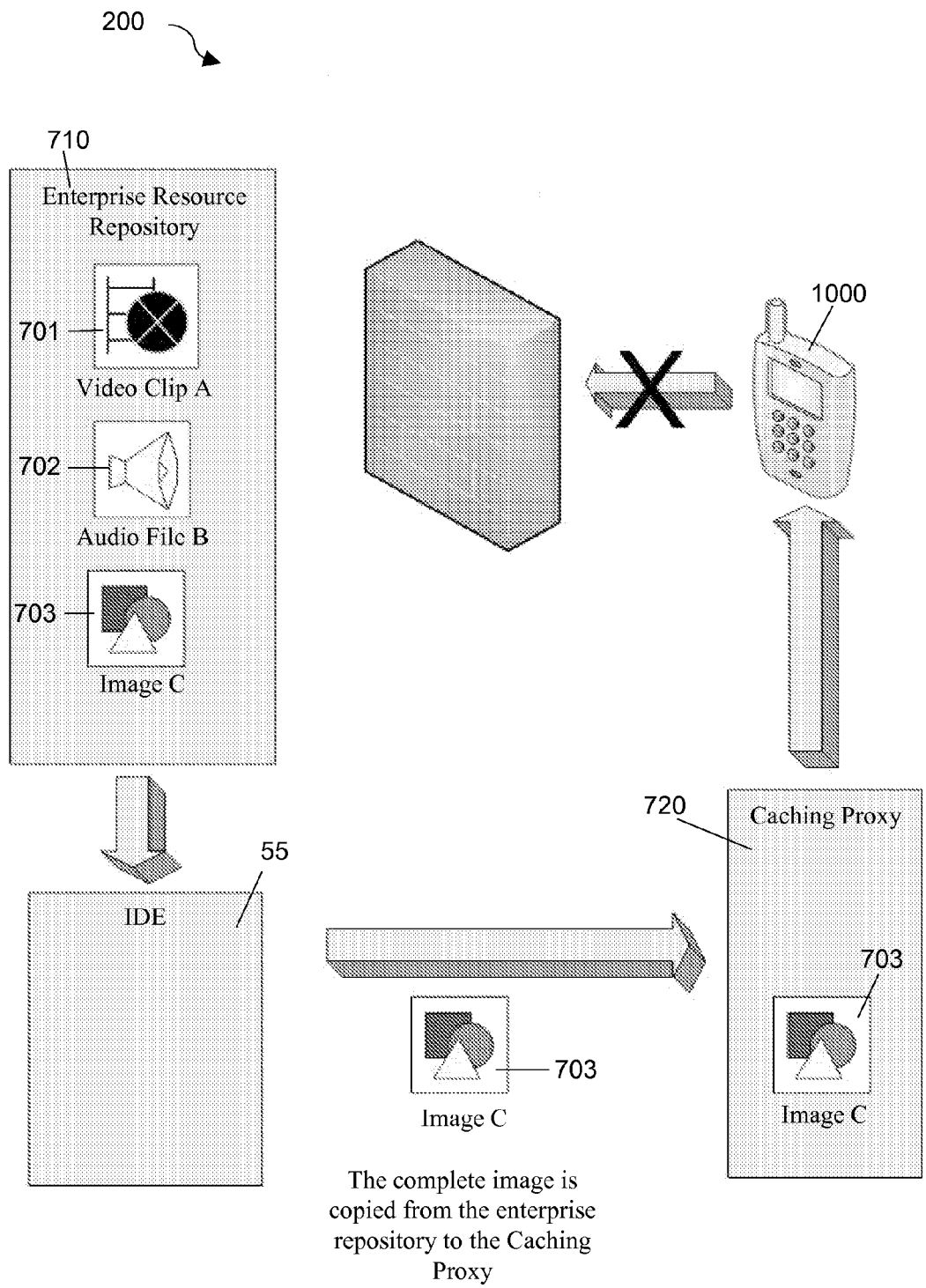
FIG. 23 depicts publishing an enterprise resource to the caching proxy.

Enterprise resources are those images, binaries and multimedia files that are visible/accessible to the application programmer but are not visible/accessible to the public Internet. These resources need to be published (i.e., copied) in their entirety to the Caching Proxy when the application is published. Referring to FIG. 23, the enterprise resource repository 710 includes video clip 701, audio file 702 and image file 703. The IDE receives a pre-selected resource and copies it to the caching proxy 720. In this example, the copied resource is image file 703. Mobile device 1000 accesses the image file 703 by accessing the caching proxy 720. In this case, mobile device 1000 does not have direct access to the enterprise resources 710.

Figure 24:
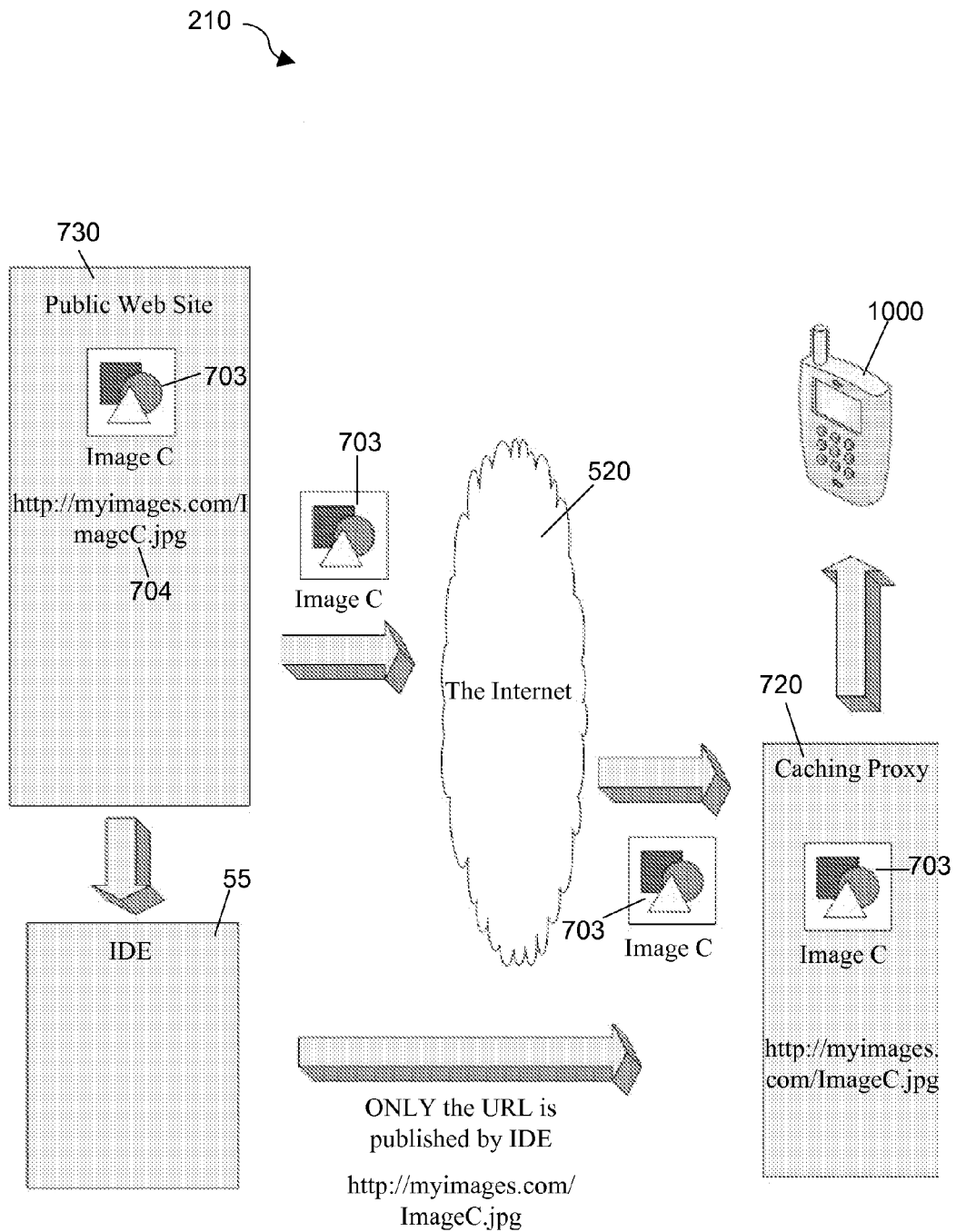
FIG. 24 depicts publishing a network resource to the caching proxy.

Network resources are those images, binaries and multimedia files that are visible/accessible to the application programmer and also visible/accessible to the public Internet. These resources have their URLs published in to the Caching Proxy when the application is published. However, the copying of the physical bytes of the actual resource happens on a configurable schedule set by the programmer and is done from the public web site to the Caching Proxy with no IDE intermediary. Referring to FIG. 24, image 703 is a network resource published on a public web site 730. Web site 730 is accessible via its URL 704 (http://myimages.com/ImageC.jpg). The URL 704 is published by the IDE in the caching proxy 720 and becomes available to the mobile device 1000. The actual image 703 is then downloaded via the Internet 520 to the caching proxy 720.

The client-side resource manager takes a specific, configurable-size pool of local storage and tries to keep available locally the set of resources required by the current state, and any state that can be gotten to directly from the current state. Consider the following case of an application with 5 states (screens) and 13 resources totaling 19 Mb.

| State | Resources required | Total resources |
|---|---|---|
| S1 | 1Mb 2Mb 3Mb | 6 Mb |
| S2 | 1Mb 1Mb | 2 Mb |
| S3 | 2Mb 1Mb 1Mb 1Mb | 5 Mb |
| S4 | 1Mb | 1 Mb |
| S5 | 1Mb 2Mb 2Mb | 5 Mb |
| | | 19 Mb total |

In this case, the client-side player is configured to use a maximum 10 Mb of local storage. Obviously, the entire set of resources cannot be downloaded and stored locally for the life of the application. The client-side resource manager keeps a graph of what states can be reached from what other states, so that for any one state it knows which other states can be reached directly—without passing through any intermediate state. Assume the following state transition table for our example:

| State | States reachable | Total Resources for reachable states |
|---|---|---|
| S1 | S2 | 8 Mb |
| S2 | S3 | 7 Mb |
| S3 | S4, S1 | 12 Mb |
| S4 | S5, S3 | 11 Mb |
| S5 | S1, S4 | 12 Mb |

In the case of S1, the client-side resource manager can keep the entire set of reachable resources in local storage (6 Mb for S1 and 2 Mb for S2). The same goes for the 7 Mb of S2 and S3. In S3, the total space required (12 Mb) is greater than the available space (10 Mb), so the system starts with the resources of the current state, S3. If any resources for S1 remain in the cache, they stay there, up to the 10 Mb limit. When the transition to S4 is made, all the resources for S4 must be downloaded on-demand.

The client-side resource manager uses the downtime between the display of a new state and interaction with that state by the user (however long it takes the user to 'absorb' the information on the screen) to rebuild the cache with the new resource set. The application programmer may also override the decisions of the client-side resource manager by issuing a LocalizeResource call that will cause a resource to be downloaded on-demand and kept until a DelocalizeResource call is made.

Client-side resource management is further complicated by bandwidth pricing models. Most US data plans have a total throughput limit. In that case, a user wants to be able to minimize network traffic to minimize overage charges. With an unlimited data plan, on the other hand, the user would want to ignore network traffic to maximize speed. The client-side resource manager is configurable to favor user experience over network efficiency or vice versa.

As an example of favoring network efficiency, some states that may be reachable are very unlikely to be used so that no matter whether they are technically reachable or not, one doesn't want to eat up network bandwidth making sure their resources are available locally. Error screens are the most obvious example. So an efficiency-configured player would not download resources for states that have low-probability-of-usage because those resources would get into the cache, bump out high-probability resources, then themselves be bumped back out by a reload of the previous high-probability resources.

Each Client-Side Process, JSR implementer in J2ME, launchable mime-type, or client-resident executable in Windows Mobile is identified by a GUID in the system. Local processes are embodied by the Launcher Component. Launcher call syntax is identical to SoapSender except that there is no corresponding SoapReceiver. The player determines on startup what local processes are available by querying the operating system. A reference to a non-existent local process generates an exception. The developer inserts a Launcher into the application XML as he would a WSDL, selecting from a list of predefined local processes, querying for input and output parameters, etc. Examples of predefined local processes on the Windows Mobile platform would include Pocket Outlook and Internet Explorer. Examples of a predefined local processes on J2ME would be JSR75 (the PIM implementation).

The IDE also allows the developer to describe his own local processes through the "exec" mechanism available on most platforms. Any independent, heavyweight process that can be run in this fashion with parameters passed can be defined by the Roam application developer and automatically become part of the list of 'known' local processes on that platform.

Other embodiments include the following enhancements. Enhancements of the IDE include improvements in the way that code and widgets, and web-services are integrated into the application. For example, a template containing multiple screens and the associated event-code to do a whole credit-card transaction are combined into one-draggable icon. Alternatively, an icon (with configurable properties) executes a particular database call and returns the dataset. This type of enhancement is used to deliver "Extended Components", i.e., widgets bundled with extra attributes, which generate code in the application as soon as they are set.

Transforms (using XSLT on the application XML file or via some another mechanism) are made to the finished application itself. These run on a completed application to personalize it—i.e. finding widgets with specific IDs and inserting dynamic information into them, and updating the version number on the server to send a "personalized" version of the application every day.

State information is sent to an output device other than a screen. The system uses this enhancement to deliver "print" functionality: i.e. some screens are designated (in the application) as "Print Screens." When the player reaches such a screen (or a command to access such a screen), it is drawn to a printer rather than displayed on the screen. We may also have an entirely non-visual version of the player. In one example, a non-visual player is installed on a robot which needs to respond to web-service data, but doesn't necessarily need to have a corresponding display.

In some embodiments, the option of one-to-many certificates is included. According to this option, the system gives one server access to some resource on the web, then wraps that access in a web-service and then makes an application out of that service. This effectively allows our environment to make that resource available to any user of the application. In this way, access control becomes programmatic rather than depending on a proliferation of certificates. Alternately, the system issues its own certificate to each device and each device submits its certificate information with a session signon process.

Other functionalities, besides web-services, that a server could access are designed to fit into this RIA developing model. Examples of other functionalities that are designed to fit the present model include remote procedure calls (RPCs) or calls to local application programming interfaces (API's). In one example, a "RoamAPI" is included with the IDE in order to bundle access to this kind of functionality. The server calls the "RoamAPI" with parameters and returns a return value. These pieces of functionality may also be defined by a GUID and even a WSDL (to give input/output parameters) and then executed outside of a web-service model. In one example, "sponsored" web-services are listed in the IDE itself as "sponsored" function calls. Less generic User Interfaces for these functions may also be bundled in the WSDL generator for the convenience of the developer.

The server 3000 implements web service orchestration, the combining of multiple web service calls into a single chain. The remote device makes a single call to the single chain and the server 3000 decomposes the chain into its constituent web service calls, issues the calls, aggregates the results and returns the single result set to the remote device. This is a significant performance advantage over existing AJAX-style solutions as the server 3000 is vastly more powerful than the remote devices connecting to it, and has a much faster and more reliable connection to the destination web services than the remote device. Orchestration also allows the server 3000 to provide transactionality within web service chains. Transactionality is the idea that each web service call in a chain is dependent on the success of all the others, and that a failure in one call should cause us to skip any succeeding calls and to roll back any preceding calls in the chain and for the chain to return failure.

Remote devices in the system can operate in both online (connected) and offline (disconnected) mode and move seamlessly from one mode to the other. This is enabled by storing web service chain calls on the remote device disconnected from the application context in which they occurred. In one example, a user fills out a form to be submitted to a web site. The typical application attaches the values that the user enters to the form the user is filling out. If the remote device goes offline, the application might be able to reload the form with the stored values. The form with the saved values can only be used at other points in the application where that particular visual representation of the data makes sense. Typically, that never happens. The application player, on the other hand, stores the "action" the user tried to perform when he hit the submit button on the form. This allows the application player to accumulate actions that the user wants to perform when the remote device restores its connection, and to execute those actions within a different application context (visual representation) than the one in which the action was first formulated. It is a fundamental philosophical and architectural difference between the present system and other solutions that keep an offline store of web service chain calls rather than pictures of forms to enable offline functionality.

Several embodiments of the present invention have been described. Nevertheless, it will be understood that various modifications may be made without departing from the spirit and scope of the invention. Accordingly, other embodiments are within the scope of the following claims.

What is claimed is:

1. A method for developing a Rich Internet Application (RIA) configured to run on a remote computing device by an application player residing in said remote computing device comprising:

providing an integrated development environment (IDE) for authoring said RIA wherein said IDE comprises a toolbox for adding graphical components to a user interface (UI) state, a Web Service Description Language (WSDL) integrator for accessing and manipulating web services and tools for adding logic to the graphical components of the user interface state;

developing a RIA process flow;

implementing said RIA process flow with said IDE by generating one or more UI states;

dragging and dropping one or more graphical components from said toolbox into said UI states;

setting one or more property values for each of said graphical components;

generating with said WSDL integrator one or more web service calls for accessing one or more web services, wherein said web services are configured to receive input from said UI states, process it and produce an output; and wherein said web services are accessed by connecting said remote computing device to an intermediary server and wherein said intermediary server accesses said web services via a single, secure and access-controlled network connection.

2. The method of claim 1 wherein said RIA process flow comprises at least an input UI state, a processing UI state, at least an output UI state and an error UI state.

3. The method of claim 2 wherein said graphical components comprise one of label for displaying content, textbox for entering content, or a selector for initiating processing via said web service calls.

4. The method of claim 3 wherein properties of said graphical components comprise one of name, horizontal and vertical location coordinates, height, width, length, persistency, visibility, text format, numeric format, alignment, style, key associated with a selector, or target state for a selector.

5. The method of claim 1 further comprising adding logic to said UI graphical components.

6. The method of claim 1 wherein said IDE is configured to provide a state view of the RIA, a score view of the RIA, a code view of the RIA and a script view of the RIA, wherein said state view displays a visual image of a UI state, one state at a time, wherein said score view displays a table listing said graphical components for each state, wherein said code view displays code associated with each state, wherein said script view displays script associated with a single graphical component, and wherein said RIA is configured to be authored in any of said views.

7. The method of claim 1 wherein said RIA comprises an Extensible Mark-up Language (XML) format.

8. The method of claim 7 further comprising,
submitting said RIA to a testing server;
debugging and validating said application by said testing server;
converting said web service calls to Global Unique Identifiers (GUIDs);
transforming said RIA format to said computing device's format; and
deploying said RIA to said remote computing device.

9. A system for developing a Rich Internet Application (RIA) configured to run on a remote computing device by an application player residing in said remote computing device comprising:
a remote computing device comprising an application player;
a computing unit comprising an integrated development environment (IDE), wherein said IDE comprises:
a toolbox comprising graphical components configured to be dragged and dropped into UI states implementing a process flow of said RIA and tools for setting one or more property values for each of said graphical components;
a Web Service Description Language (WSDL) integrator configured to generate one or more web service call for accessing one or more web services for processing input from said UI states; and
wherein said web services are accessed by connecting said remote computing device to an intermediary server and wherein said intermediary server accesses said web services via a single, secure and access-controlled network connection.

10. The system of claim 9 wherein said RIA process flow comprises at least an input UI state, a processing UI state, at least an output UI state and an error UI state.

11. The system of claim 10 wherein said graphical components comprise one of label for displaying content, textbox for entering content, or a selector for initiating processing via said web service calls.

12. The system of claim 11 wherein properties of said graphical components comprise one of name, horizontal and vertical location coordinates, height, width, length, persistency, visibility, text format, numeric format, alignment, style, key associated with a selector, or target state for a selector.

13. The system of claim 9 wherein said IDE further comprises tools for adding logic to said UI graphical components.

14. The system of claim 9 wherein said IDE is configured to provide a state view of the RIA, a score view of the RIA, a code view of the RIA and a script view of the RIA, wherein said state view displays a visual image of a UI state, one state at a time, wherein said score view displays a table listing said graphical components for each state, wherein said code view displays code associated with each state, wherein said script view displays script associated with a single graphical component, and wherein said RIA is configured to be authored in any of said views.

15. The system of claim 9 wherein said RIA comprises an Extensible Mark-up Language (XML) format.

16. The system of claim 15 further comprising:
a development server comprising said IDE for developing said RIA;
a testing server configured to debug and validate said authored RIA;
a production server comprising tools for converting said web service calls to Global Unique Identifiers (GUIDs), tools for transforming said RIA format to said computing device's format and tools deploying said RIA to said remote computing device.

17. The system of claim 9 further comprising tools for auditing said remote computing device's activities.

18. The system of claim 9 further comprising tools for restricting access of said remote computing device to authorized functions of said web service.

19. The system of claim 9 wherein said remote computing device comprises a managed code environment and wherein said application player is executed within said managed code environment.

20. The system of claim 9 wherein said remote computing device comprises one of mobile phone, PDA, payment module, portable computer, robot, personal computer, server or a computing circuit.

* * * * *